(12) United States Patent
Park et al.

(10) Patent No.: US 12,422,643 B2
(45) Date of Patent: Sep. 23, 2025

(54) HEATING DEVICE AND CAMERA MODULE

(71) Applicant: LG INNOTEK CO., LTD., Seoul (KR)

(72) Inventors: Yong Tae Park, Seoul (KR); Beom Suk Yu, Seoul (KR); Min Woo Lee, Seoul (KR); Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 941 days.

(21) Appl. No.: 17/593,900

(22) PCT Filed: Mar. 26, 2020

(86) PCT No.: PCT/KR2020/004134
§ 371 (c)(1),
(2) Date: Sep. 27, 2021

(87) PCT Pub. No.: WO2020/197289
PCT Pub. Date: Oct. 1, 2020

(65) Prior Publication Data
US 2022/0163751 A1 May 26, 2022

(30) Foreign Application Priority Data

Mar. 26, 2019 (KR) .......................... 10-2019-0034139
Mar. 27, 2019 (KR) .......................... 10-2019-0035142

(51) Int. Cl.
*G02B 7/02* (2021.01)
*H05B 3/84* (2006.01)
(52) U.S. Cl.
CPC ............. *G02B 7/028* (2013.01); *G02B 7/021* (2013.01); *H05B 3/84* (2013.01); *H05B 2203/016* (2013.01)

(58) Field of Classification Search
CPC .......... G02B 7/028; G02B 7/021; H05B 3/84; H05B 2203/016; G03B 30/00; G03B 17/55; H04N 23/52; H04N 23/55
See application file for complete search history.

(56) References Cited

U.S. PATENT DOCUMENTS

2006/0171704 A1    8/2006  Bingle et al.
2007/0109441 A1    5/2007  Cheng
(Continued)

FOREIGN PATENT DOCUMENTS

CN    108020981 A  *  5/2018    ............. G03B 11/00
CN    108027548 A     5/2018
(Continued)

OTHER PUBLICATIONS

Office Action dated Apr. 16, 2024 in Japanese Application No. 2021-557272.
(Continued)

*Primary Examiner* — Thomas K Pham
*Assistant Examiner* — Jennifer A Jones
(74) *Attorney, Agent, or Firm* — Saliwanchik, Lloyd & Eisenschenk

(57) ABSTRACT

The present embodiment relates to a heating device comprising: a substrate; a connection terminal electrically connected to the substrate; and a heating member electrically connected to the connection terminal, wherein the connection terminal includes a first region including an inner portion and an outer portion, a third region electrically connected to the substrate, and a second region disposed between the first region and the third region, and the heating member is disposed between the inner portion and the outer portion of the connection terminal.

16 Claims, 23 Drawing Sheets

(56) References Cited

U.S. PATENT DOCUMENTS

| | | |
|---|---|---|
| 2011/0080516 A1 | 4/2011 | Yi et al. |
| 2011/0279675 A1 | 11/2011 | Mano et al. |
| 2018/0176431 A1 | 6/2018 | Kim et al. |
| 2018/0314032 A1 | 11/2018 | Kim |
| 2019/0124238 A1* | 4/2019 | Byrne .................... H04N 23/52 |
| 2019/0208577 A1* | 7/2019 | Chien .................... G03B 17/55 |
| 2020/0116994 A1* | 4/2020 | Gu .......................... G03B 17/55 |
| 2021/0294066 A1* | 9/2021 | Hirata .................. H05B 1/0288 |

FOREIGN PATENT DOCUMENTS

| | | |
|---|---|---|
| CN | 108700795 A | 10/2018 |
| CN | 208548960 U | 2/2019 |
| EP | 3 352 008 A1 | 7/2018 |
| JP | 8-84277 A | 3/1996 |
| JP | 2004-325603 A | 11/2004 |
| JP | 2010-153963 A | 7/2010 |
| JP | 2011-66560 A | 3/2011 |
| JP | 2013-105034 A | 5/2013 |
| JP | 2018-116121 A | 7/2018 |
| KR | 10-2017-0032585 A | 3/2017 |
| KR | 10-2017-0040672 A | 4/2017 |
| KR | 10-2017-0041360 A | 4/2017 |
| KR | 10-2017-0095613 A | 8/2017 |
| KR | 10-2018-0006045 A | 1/2018 |
| KR | 10-2018-0093486 A | 8/2018 |
| WO | 2018/030647 A1 | 2/2018 |
| WO | 2019/225745 A1 | 11/2019 |

OTHER PUBLICATIONS

International Search Report dated Jul. 3, 2020 in International Application No. PCT/KR2020/004134.
Office Action dated May 27, 2023 in Chinese Application No. 202080024720.5.
Supplementary European Search Report dated Nov. 24, 2022 in European Application No. 20777767.3.
Office Action dated Jan. 15, 2025 in Korean Application No. 10-2019-0034139.
Office Action dated Jan. 15, 2025 in Korean Application No. 10-2019-0035142.
European Search Report dated Jul. 18, 2025 in European Application No. 25172918.2.

* cited by examiner

10

1010

1020

HEATING DEVICE AND CAMERA MODULE

CROSS-REFERENCE TO RELATED APPLICATIONS

This application is the U.S. national stage application of International Patent Application No. PCT/KR2020/004134, filed Mar. 26, 2020, which claims the benefit under 35 U.S.C. § 119 of Korean Application Nos. 10-2019-0034139, filed Mar. 26, 2019; and 10-2019-0035142, filed Mar. 27, 2019; the disclosures of each of which are incorporated herein by reference in their entirety.

TECHNICAL FIELD

The present embodiment relates to a heating device and a camera module.

BACKGROUND ART

In recent years, micro-camera modules have been developed, and micro-camera modules are widely used in small electronic products such as smart phones, notebook computers, and game consoles.

As automobiles become more popular among public, micro-cameras are widely used not only in small electronic products but also in vehicles. For example, a black box camera for the protection of a vehicle or objective data of a traffic accident, a rear surveillance camera that enables the driver to monitor the blind spot at the rear of the vehicle through the screen to ensure safety when the vehicle is reversing, a surrounding detection camera that can monitor the surroundings of the vehicle, and the like are provided.

The camera may include a lens, a lens barrel accommodating the lens, an image sensor for converting an image of a subject collected in the lens into an electrical signal, and a printed circuit board on which the image sensor is mounted. The housing constituting the outer shape of the camera has a structure in which the entire region is sealed in order to inhibit contamination of internal parts from foreign substances including moisture.

Due to the characteristics of a vehicle that is disposed outdoors, the temperature inside and outside the vehicle forms a variety of distributions depending on the time. For example, in summer, the indoor temperature may be higher than the outdoor temperature, and in winter, the temperature may drop to below zero. Accordingly, condensation including frost may occur in the components including the lens and glass of the camera according to an abrupt temperature change. For this reason, satisfactory image recordings may not be obtained, or may cause a product failure.

DETAILED DESCRIPTION OF THE INVENTION

Technical Subject

An object to be solved by the present invention is to provide a heating device and a camera module capable of inhibiting condensation including frost from occurring on a lens.

An object of the present invention is to provide a humidity control unit of a camera device and a camera device capable of inhibiting condensation including frost from occurring on a lens.

Technical Solution

A heating device according to an aspect of the present invention for achieving the above object comprises: a substrate; a connection terminal electrically connected to the substrate; and a heating member electrically connected to the connection terminal, wherein the connection terminal includes: a first region including an inner side portion and an outer side portion; a third region electrically connected to the substrate; and a second region disposed between the first region and the third region, and wherein the heating member is disposed between the inner side portion and the outer side portion of the connection terminal.

In addition, the inner side portion is bent and extended from a middle region of one end of the second region, and the outer side portion may be bent and extended from an outer side region of the one end of the second region.

In addition, the inner side portion and the outer side portion may be spaced apart from each other.

In addition, the inner side portion and the outer side portion may include a curved region.

In addition, the heating member may be formed in a ring shape.

In addition, the heating member may include a body and a heating material disposed on the body.

In addition, the heating material may include a first heating material disposed on an upper surface of the body of the heating member and a second heating material disposed on a lower surface of the body of the heating member.

In addition, the inner side portion is disposed on an upper surface of the heating member, and the outer side portion may be disposed on a lower surface of the heating member.

In addition, a height at which the inner side portion is positioned and a height at which the outer side portion is positioned in the optical axis direction may be different from each other.

A camera module according to an aspect of the present invention for achieving the above object includes: a substrate; a lens barrel disposed on the substrate; a first lens disposed on the lens barrel; a heating member disposed between the first lens and the lens barrel; and a connection terminal electrically connected to the heating member, wherein the heating member includes a body and a heating material disposed on the body, and wherein the connection terminal may include: a first region connected to the heating material of the heating member; a third region electrically connected to the substrate; and a second region disposed between the first region and the third region.

In addition, the heating material includes: a first heating material disposed on an upper surface of the body of the heating member; and a second heating material disposed on a lower surface of the body of the heating member, wherein the first region of the connection terminal may include: a first connection portion connected to the first heating material; and a second connection portion connected to the second heating material.

In addition, the first lens may be a lens disposed at an outermost region, and the first region of the connection terminal and the heating material may be connected to a lower surface of the first lens.

In addition, it may include a retainer disposed on the lens barrel to fix the first lens.

In addition, the substrate may include a control unit and a resistor disposed between the connection terminal and the control unit.

In addition, the resistor includes a first resistor and a second resistor, the first resistor is electrically connected to the first connection portion of the connection terminal, and the second resistor can be electrically connected to the second connection portion of the connection terminal.

In addition, the first connection portion includes: a first electrode portion having a first voltage; and a second electrode portion having a second voltage that is lower than the first voltage, wherein the second connection portion includes: a third electrode portion having a third voltage; and a fourth electrode portion having a fourth voltage that is lower than the third voltage, and wherein the first resistor is electrically connected to the second electrode portion of the first connection portion, and the second resistor may be electrically connected to the fourth electrode portion of the second connection portion.

A humidity control unit of a camera device according to an aspect of the present invention for achieving the above object includes: a connection terminal connected to a power source; a heater connected to the connection terminal; and a desiccant disposed on the heater, wherein the desiccant and the heater have a closed-loop shape.

In addition, the connection terminal is a flexible board; the heater is electrically connected to the flexible board and includes a heating wire having a closed loop shape; and the desiccant may include silica gel and adhere to one surface of the heater.

In addition, it may include a heat insulator coupled to the other surface of the heater.

A camera device according to an aspect of the present invention for achieving the above object includes: a housing; a lens module disposed in the housing; a substrate disposed on the housing; a connection terminal connected to the substrate; a heater connected to the connection terminal; and a desiccant disposed on the heater, wherein the heater and the desiccant are disposed in the housing.

In addition, the heater and the desiccant may be disposed on an inner side surface of the substrate or the housing.

In addition, a connector coupled to the substrate through the housing, and an image sensor disposed on the substrate are included, wherein the desiccant may be disposed around at least one of the image sensor, the connector, and the lens module.

In addition, the desiccant and the heater may include an opening, and a portion of the image sensor or the connector may be disposed in the opening.

In addition, the desiccant and the heater may have a closed loop shape.

In addition, the substrate may include a first substrate and a second substrate disposed under the first substrate, wherein the heater may be disposed on the first substrate, and wherein the connection terminal may be connected to the second substrate.

In addition, a sensor disposed on the substrate and measuring temperature and humidity may be included.

A camera device according to an aspect of the present invention for achieving the above object comprises: a housing; an image sensor disposed in the housing; a connector disposed on the housing; a desiccant disposed adjacent to the image sensor or the connector; a heater coupled to the desiccant; a substrate electrically connected to the heater; and a control unit for controlling the heater, wherein the desiccant absorbs moisture when the internal temperature of the housing is less than or equal to a first reference value, and wherein the control unit operates the heater when the internal temperature of the housing is greater than or equal to a second reference value.

In addition, a sensor for measuring a temperature inside the housing may be included, wherein the control unit may control on/off of the heater according to the measured temperature.

Advantageous Effects

Through the present embodiment, it is possible to provide a heating device and a camera module capable of inhibiting condensation including frost from occurring on the lens.

Through the present embodiment, it is possible to provide a humidity control unit of a camera device and the camera device capable of inhibiting condensation including frost from occurring on a lens.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

An 'optical axis direction' used below is defined as an optical axis direction of a lens coupled to the lens driving device. Meanwhile, the 'optical axis direction' may correspond to an 'up-down direction', a 'z-axis direction', and the like.

Hereinafter, a first embodiment of the present invention will be described in more detail with reference to the accompanying drawings.

Figure 1:
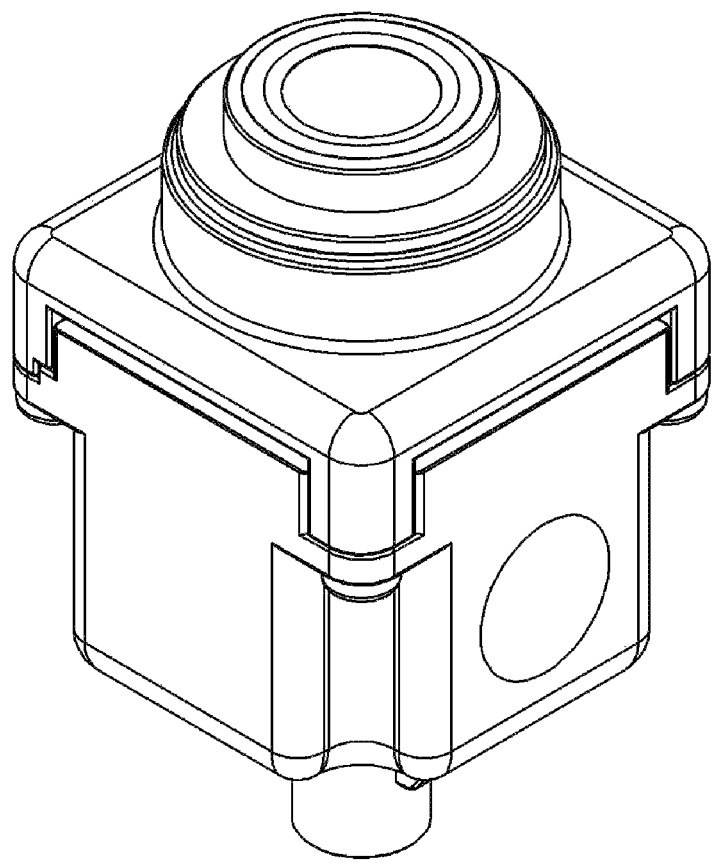
FIG. 1 is a perspective view of a camera module according to a first embodiment of the present invention.
Figure 2:
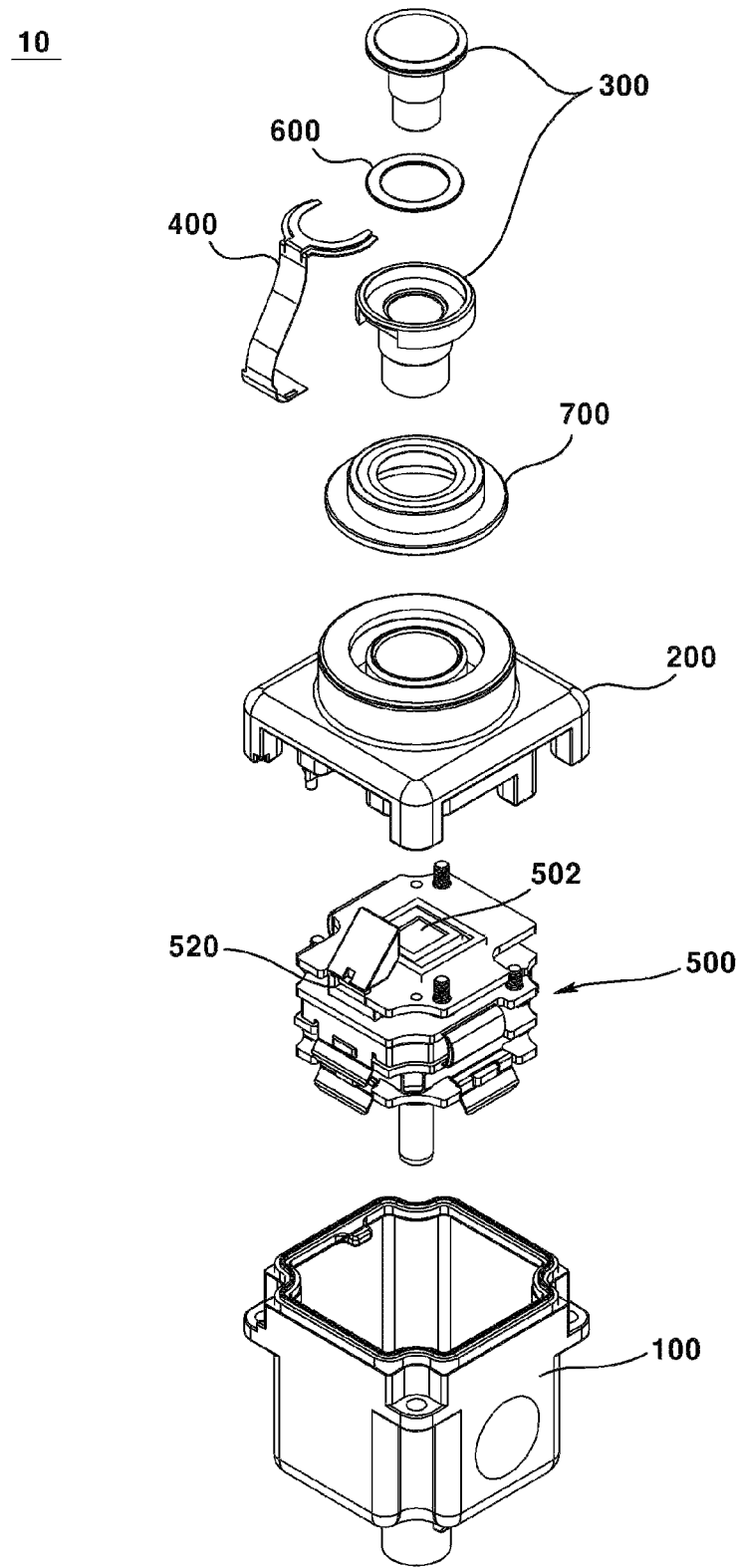
FIG. 2 is an exploded perspective view of a camera module according to a first embodiment of the present invention.
Figure 3:
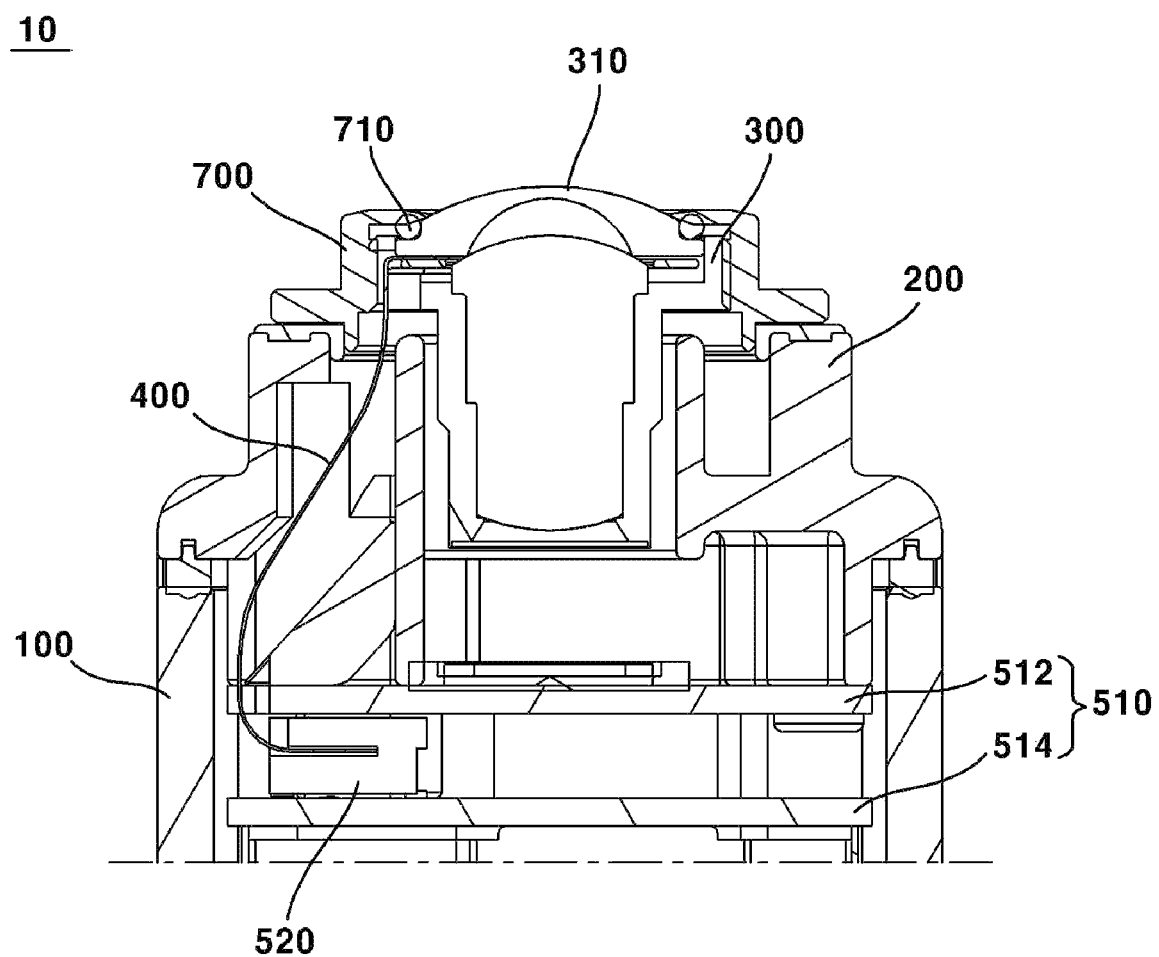
FIG. 3 is a cross-sectional view of a camera module according to a first embodiment of the present invention.
Figure 4:
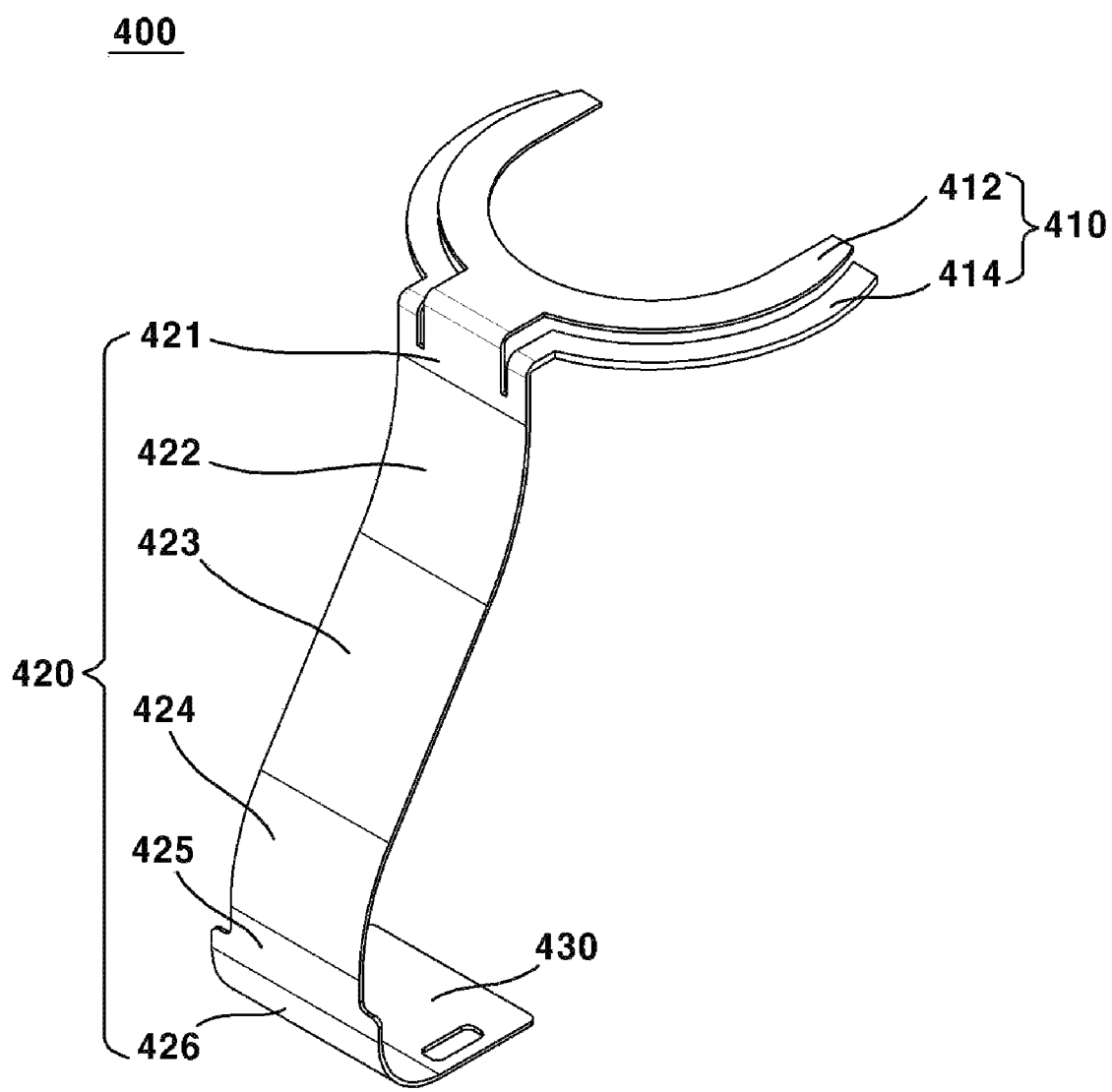
FIG. 4 is a perspective view of the connection terminal of the camera module according to a first embodiment of the present invention.
Figure 5:
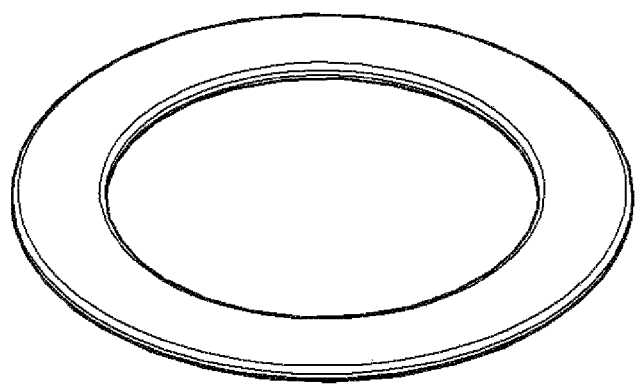
FIG. 5 is a perspective view of a heating member of a camera module according to a first embodiment of the present invention.
Figure 6:
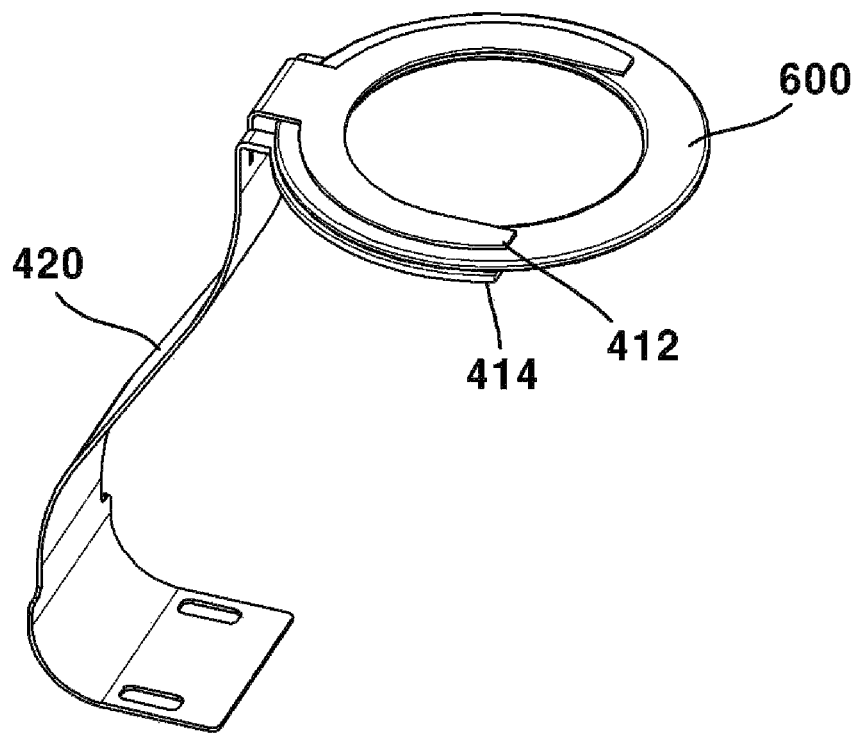
FIG. 6 is a perspective view of a connection terminal and a heating member of a camera module according to a first embodiment of the present invention.
Figure 7:
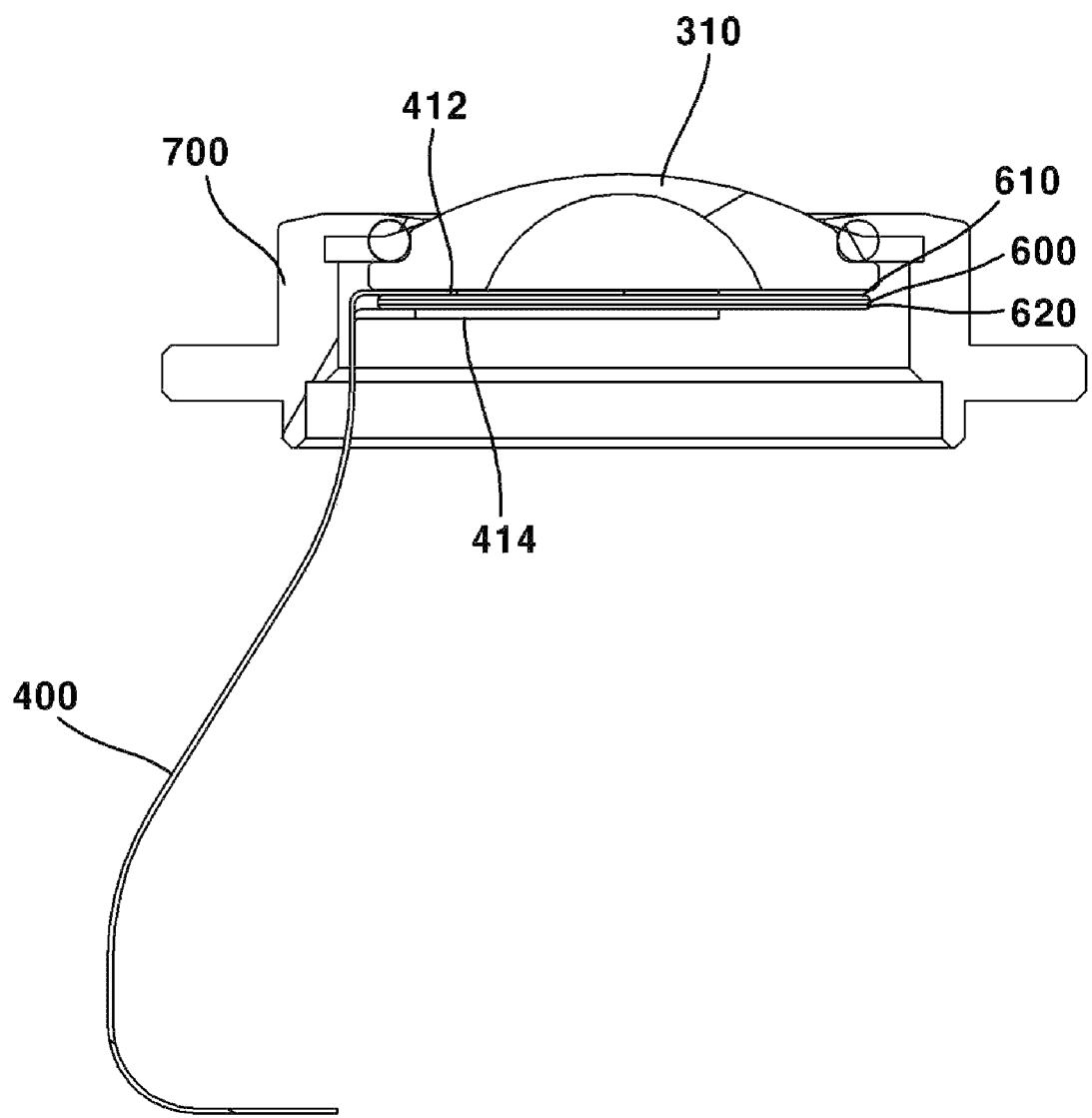
FIG. 7 is a partial cross-sectional view of a camera module according to a first embodiment of the present invention.
Figure 8:
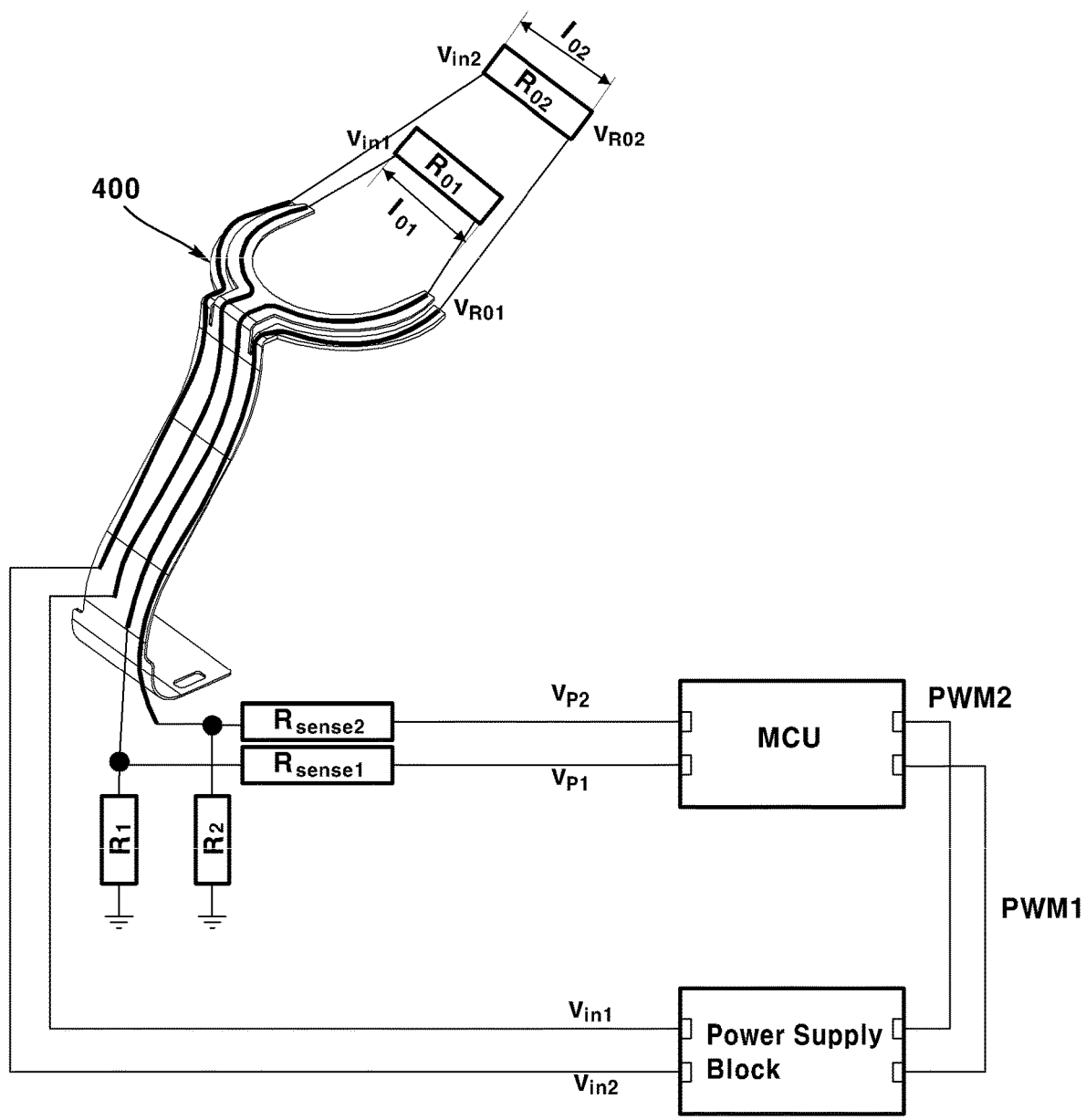
FIG. 8 and FIG. 9 are schematic circuit diagrams of a camera module according to a first embodiment of the present invention.
Figure 9:
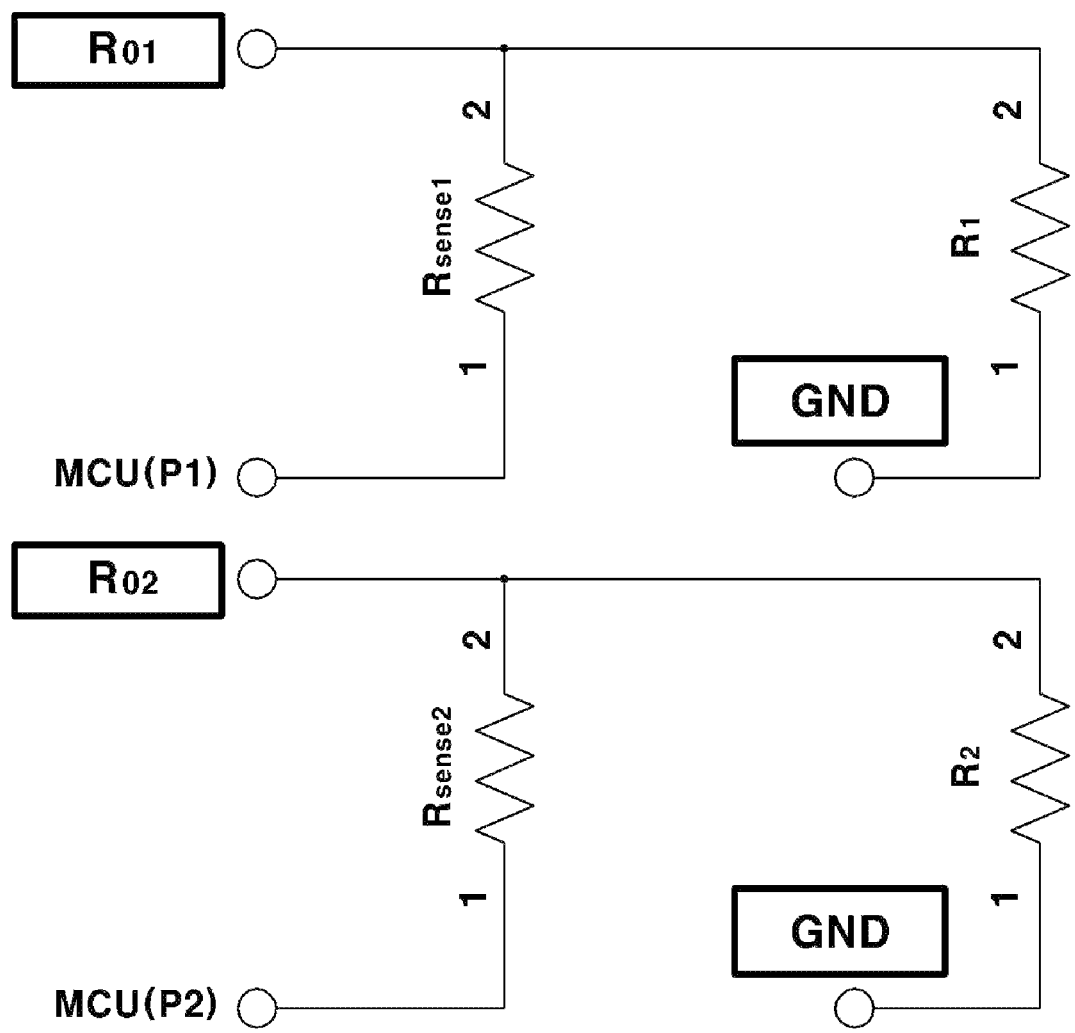

FIG. 1 is a perspective view of a camera module according to a first embodiment of the present invention. FIG. 2 is an exploded perspective view of a camera module according to a first embodiment of the present invention. FIG. 3 is a cross-sectional view of a camera module according to a first embodiment of the present invention. FIG. 4 is a perspective view of the connection terminal of the camera module according to a first embodiment of the present invention. FIG. 5 is a perspective view of a heating member of a camera module according to a first embodiment of the present invention. FIG. 6 is a perspective view of a connection terminal and a heating member of a camera module according to a first embodiment of the present invention. FIG. 7 is a partial cross-sectional view of a camera module according to a first embodiment of the present invention. FIG. 8 and FIG. 9 is a schematic circuit diagram of a camera module according to a first embodiment of the present invention.

Referring to FIG. 1 to FIG. 9, the camera module 10 according to the first embodiment of the present invention may include: a housing 100, a lens barrel 200; a lens module 300; a connection terminal 400; a substrate 510; and a connector 520; the heating member 600; and a retainer 700, but may be implemented except for some of these configurations, and does not exclude additional configurations other than these.

In addition, the camera module 10 according to the first embodiment of the present invention may include a heating device. The heating device according to a first embodiment of the present invention may include: a substrate 510; a connection terminal 400; and a heating member 600, but additional configurations are not excluded.

The camera module 10 may include a housing 100. The housing 100 may form the outer appearance of the camera module 10. In the housing 100, a lens barrel 200, a lens module 300, a connection terminal 400, a substrate 510, a connector 520, a heating member 600, and a retainer 700 may be disposed. The housing 100 may include an upper housing and a lower housing.

The camera module 10 may include a lens barrel 200. The lens barrel 200 may be disposed in the housing 100. The lens barrel 200 may be disposed inside the housing 100. The lens barrel 200 may be coupled to the housing 100. The lens barrel 200 may be coupled to the front of the housing 100. The lens module 300 may be disposed in the lens barrel 200. The lens barrel 200 may accommodate at least a portion of the lens module 300. The lens barrel 200 may include an opening in which the lens module 300 is disposed. The first lens 310 of the lens module 300, that is, the outermost lens, may be exposed to the upper portion of the lens barrel 200. The central position of the lens barrel 200 may correspond to the central position of the lens module 300. At least a portion of the lens barrel 200 may be overlapped with the connection terminal 400 in a direction perpendicular to the optical axis. At least a portion of the connection terminal 400 may be disposed in a space between the lens barrel 200 and the housing 100. A retainer 700 may be coupled to the lens barrel 200. A retainer 700 may be coupled to the front of the lens barrel 200. The lens barrel 200 may be made of a non-metal material such as a synthetic resin material by using a plastic injection or die-casting casting method, but is not limited thereto, and the material of the lens barrel 200 may be variously changed.

The camera module 10 may include a lens module 300. The lens module 300 may be accommodated in the lens barrel 200. The lens module 300 may be disposed in the opening of the lens barrel 200. The lens module 300 may penetrate through the opening of the lens barrel 200. The lens module 300 may be screw-coupled to an inner circumferential surface of the lens barrel 200. On an outer circumferential surface of the lens module 300, a screw thread corresponding screw thread formed on the inner circumferential surface of the lens barrel 200 may be formed. The lens module 300 may include a first lens 310 that is an outermost lens and at least one lens disposed under the first lens 310. The first lens 310 of the lens module 300 may be exposed above the lens barrel 200. At least a portion of the first lens 310 of the lens module 300 may be disposed above the lens barrel 200. At least one lens of the lens module 300 may be disposed below the first lens 310. Each lens of the lens module 300 may be made of a synthetic resin material, a glass material, or a quartz material, but is not limited thereto and may be made of various materials.

The camera module 10 may include a connection terminal 400. The connection terminal 400 may be electrically connected to the substrate 510. The connection terminal 400 may be electrically connected to the heating member 600. The connection terminal 400 may electrically connect the heating member 600 and the substrate 510. The connection terminal 400 may be electrically connected to the connector 520. The connection terminal 400 may electrically connect the heating member 600 and the connector 520. The connection terminal 400 may supply current from the substrate 510 to the heating member 600. The connection terminal 400 may include a first region 410 disposed adjacent to the first lens 310, a third region 430 disposed adjacent to the substrate 510, and a second region 420 connecting the first region 410 and the third region 430.

The connection terminal 400 may include a first region 410. The first region 410 may be disposed on an upper portion of the second region 420 and the third region 430. The first region 410 may be disposed between the lens barrel 200 and the lens module 300. The first region 410 may be disposed in the lens barrel 200. The first region 410 may be disposed in the lens module 300. The first region 410 may be disposed between the first lens 310 and at least one lens of the lens module 300. The first region 410 may be disposed between the first lens 310 and the lens barrel 200. The first region 410 may include an inner side portion 412 and an outer side portion 414. The first region 410 may be coupled to the heating member 600. The first region 410 may be coupled to the heating member 600 through contact means 610 and 620. The first region 410 may be electrically connected to the heating member 600.

The inner side portion 412 may be formed to be extended from one end 421 of the second region 420. The inner side portion 412 may be formed to be extended from the central region of the one end 421 of the second region 420. The inner side portion 412 may be bent and extended from the central region of the one end 421 of the second region 420. The inner side portion 412 may include a curved region. The inner side portion 412 may be formed of a curved region. The inner side portion 412 may be formed in a ring shape. The inner side portion 412 may be formed in a half-ring shape. The inner side portion 412 may be formed in a horseshoe shape. The inner side portion 412 may be spaced apart from the outer side portion 414. The inner side portion 412 may be disposed at a higher position than the outer side portion 414. The inner side portion 412 may be disposed on an upper surface of the heating member 600. A lower surface of the inner side portion 412 may be coupled to an upper surface of the heating member 600. The lower surface of the inner side portion 412 may be electrically connected to an upper surface of the heating member 600. A lower surface of the inner side portion 412 may be ACF bonded to an upper surface of the heating member 600. A lower surface of the inner side portion 412 may be combined with a first heating material of the heating member 600. A lower surface of the inner side portion 412 may be electrically connected to a first heating material of the heating member 600. A lower surface of the inner side portion 412 may be ACF-bonded with a first heating material of the heating member 600. The inner side portion 412 may be a first connection portion connected to a first heating material. An upper surface of the inner side portion 412 may be coupled to a lower surface of the first lens 310. At least a portion of an upper surface of the inner side portion 412 may be coupled to at least a portion of a lower surface of the first lens 310.

The outer side portion 414 may be formed to be extended from one end 421 of the second region 420. The outer side portion 414 may be formed to be extended from the outer side region of the one end 421 of the second region 420. The outer side portion 414 may be bent and extended from the outer side region of the one end 421 of the second region 420. The outer side portion 414 may include a curved region. The outer side portion 414 may be formed of a curved region. The outer side portion 414 may be formed in a ring shape. The outer side portion 414 may be formed in a half-ring shape. The outer side portion 414 may be formed in a horseshoe shape. The outer side portion 414 may be spaced apart from the inner side portion 412. The outer side portion 414 may be disposed at a lower position than the inner side portion 412. The outer side portion 414 may be disposed on a lower surface of the heating member 600. An upper surface of the outer side portion 414 may be coupled to a lower surface of the heating member 600. The upper surface of the outer side portion 414 may be electrically connected to a lower surface of the heating member 600. The upper surface of the outer side portion 414 may be ACF-bonded to a lower surface of the heating member 600. The upper surface of the outer side portion 414 may be combined with a second heating material of the heating member 600. The upper surface of the outer side portion 414 may be electrically connected to a second heating material of the heating member 600. An upper surface of the outer side portion 414 may be ACF-bonded with a second heating material of the heating member 600. The outer side portion 414 may be a second connection portion connected to the second heating material. The lower surface of the outer side portion 414 may be seated on an inner side surface of the lens barrel 200. A lower surface of the outer side portion 414 may be seated on an upper portion of the at least one lens.

In the first embodiment of the present invention, although it is exemplary described that the height at which the inner side portion 412 is located is higher than the height at which the outer side portion 414 is located, but is not limited thereto, and the height at which the outer side portion 414 is located may be higher than the height at which the inner side portion 412 is located.

The connection terminal 400 may include a second region 420. The second region 420 may connect the first region 410 and the third region 430. The second region 420 may be bent at least once. The second region 420 may penetrate through at least one region of the housing 100, the lens barrel 200, and the retainer 700. Specifically, the second region 420 passes through the space between the retainer 700 and the lens module 300, passes through the space between the lens barrel 200 and the lens module 300, and may pass through the space between the housing 100 and the lens modules 300. The second region 420 may include: one end 421 connected to the first region 410; a first curved region 422 being extended downward from one end 421; a second curved region 423 being extended downward from the first curved region 422; a third curved region 424 being extended downward from the second curved region 423; a fourth curved region 425 being extended downward from the third curved region 424; and other end 426 connecting the fourth curved region 425 and the third region 430. At this time, the widths of the first to fourth curved regions 422, 423, 424, and 425 may be the same. The first to fourth curved regions 422, 423, 424, and 425 may have different lengths. The first to fourth curved regions 422, 423, 424, and 425 may have different curvatures. The second region 420 may be formed in an 'S' shape as a whole.

The connection terminal 400 may include a third region 430. The third region 430 may be formed to be extended from the second region 420. The third region 430 may be bent from the other end 426 of the second region 420. The third region 430 may be connected to the substrate 510. The third region 430 may be connected to the connector 520. The third region 430 may be electrically connected to the substrate 510. The third region 430 may be electrically connected to the substrate 510 through the connector 520. The third region 430 may have a flat plate shape. The third region 430 may be formed to be extended in a direction perpendicular to the optical axis.

The camera module 10 may include a substrate 510. The camera module 10 may include a substrate 510. The substrate 510 may be disposed in the housing 100. The substrate 510 may include a printed circuit board (PCB) or a flexible printed circuit board (FPCB). The substrate 510 may be coupled to the connection terminal 400. The substrate 510 may be electrically connected to the connection terminal 400. The substrate 510 may be electrically connected to the third region 430 of the connection terminal 400.

The substrate 510 may include a plurality of substrates 512 and 514. The substrate 510 may include a first substrate 512 on which the image sensor 502 is disposed, and a second substrate 514 disposed below the first substrate 512 and electrically connected to the first substrate. In this case, the first and second substrates 512 and 514 may be spaced apart from each other in the optical axis direction (vertical direction), and may be disposed in parallel to improve space efficiency. A connector 520 may be disposed between the first substrate 512 and the second substrate 514. Referring to FIG. 2, in the embodiment of the present invention, the plurality of substrates is described as an example of four, but the number of the plurality of substrates is not limited thereto and may be variously changed.

The substrate 510 according to an embodiment of the present invention may be replaced with a printed circuit board or a circuit board. An image sensor 502 may be mounted on the substrate 510. In this case, the image sensor 502 may be electrically connected to the substrate 510. For example, the image sensor 502 may be coupled to the substrate 510 by a surface mounting technology (SMT). As another example, the image sensor 502 may be coupled to the substrate 510 by flip chip technology.

The substrate 510 may include a control unit and resistors $R_{O1}$ and $R_{O2}$ disposed between the connection terminal 400 and the control unit (MCU). The resistors $R_{O1}$ and $R_{O2}$ may include a first resistor $R_{O1}$ and a second resistor $R_{O2}$. The first resistor $R_{O1}$ may be electrically connected to the first connection portion 412 of the connection terminal 400. The second resistor $R_{O2}$ may be electrically connected to the second connection portion 414 of the connection terminal 400. In here, the first resistor $R_{O1}$ is a first heating material, and the second resistor $R_{O2}$ may be a second heating material, but is not limited thereto, and the first resistor $R_{O1}$ is an upper surface of the heating member 600, and the second resistor $R_{O2}$ may refer to a lower surface of the heating member 600. In the first embodiment of the present invention, the control unit is described as an example of an MCU, but the present invention is not limited thereto and the configuration of the control unit may be variously changed.

In addition, sensing resistors $R_{sense1}$ and $R_{sense2}$ disposed between the connection terminal 400 and the control unit, and ground resistors $R_1$ and $R_2$ disposed between the connection terminal 400 and the ground RND or between the control unit MCU and the ground RND may be included. At this time, the sensing resistors $R_{sense1}$ and $R_{sense2}$ may include: a first sensing resistor $R_{sense1}$ disposed between the first resistor $R_{O1}$ and the control unit MCU; and a second sensing resistor $R_{sense2}$ disposed between the second resistor $R_{O2}$ and the control unit MCU. The ground resistors $R_1$ and $R_2$ may include: a first ground resistor $R_1$ disposed between the first resistor $R_1$ and the ground RND; and a second ground resistor $R_2$ disposed between the second resistor $R_2$ and the ground RND.

The first connection portion 412 may include a first electrode portion having a first voltage $V_{in1}$ and a second electrode portion having a second voltage $V_{RO1}$ having a voltage lower than the first voltage $V_{in1}$. The first resistor $R_{O1}$ may be electrically connected to the second electrode portion of the first connection portion 412.

The second connection portion 414 may include: a third electrode portion having a third voltage $V_{in2}$ and a fourth electrode portion having a fourth voltage $V_{RO2}$ lower than the third voltage $V_{in2}$. The second resistor $R_{O2}$ may be electrically connected to the fourth electrode portion of the second connection portion 414.

At this time, the voltage applied to the first resistor $R_{O1}$ may satisfy Equation 1, and the voltage applied to the second resistor $R_{O2}$ may satisfy Equation 2.

$$P_{R_{O1}\_heat\_initial} = \frac{(V_{in1\_initial})^2}{(R_{O1_{initial}}+R_1)} \qquad \text{[Equation 1]}$$

$$P_{R_{O2}\_heat\_initial} = \frac{(V_{in2\_initial})^2}{(R_{O2_{initial}}+R_2)} \qquad \text{[Equation 1]}$$

The first resistor $R_{O1}$ and the second resistor $R_{O2}$ may be changed due to environmental factors such as temperature change, and the first sensing resistor $R_{sense2}$ disposed between the first resistor $R_{O1}$ and the control unit MCU and a second sensing resistor $R_{sense2}$ disposed between the second resistor $R_{O2}$ and the control unit MCU may compensate for this.

The first voltage $V^{in1}$ and the second voltage $V_{RO1}$ may satisfy Equation 3, and the third voltage $V_{in2}$ and the fourth voltage $V_{RO2}$ may satisfy Equation 4.

$$V_{in1} - I_{O1}*R_{O1} = V_{RO1} \qquad \text{Equation 3}$$

$$V_{in2} - I_{O2}*R_{O2} = V_{RO1} \qquad \text{Equation 4}$$

Specifically, the change value of the first resistor $R_{O1}$ can be known by sensing the first sensing resistor $R_{sense1}$ and the second voltage $V_{RO1}$, and the change value of the second resistor $R_{O2}$ can be known by sensing the second sensing resistor $R_{sense2}$ and the fourth voltage $V_{RO2}$.

If the first resistor $R_{O1}$ decreases than the initial value, the control unit MCU decreases the value of the second voltage $V_{RO1}$ through the first PWM control PWM1, and if the first resistor $R_{O1}$ increases than the initial value, the control unit MCU increases the value of the second voltage $V_{RO1}$ through the first PWM control PWM1 to supply constant power, thereby maintaining a constant heating temperature of the heating member 600.

In addition, if the second resistor $R_{O2}$ decreases than the initial value, the control unit MCU decreases the value of the fourth voltage $V_{RO2}$ through the second PWM control PWM2, and if the second resistor $R_{O2}$ increases than the initial value, the control unit MCU increases the value of the fourth voltage $V_{RO2}$ through the second PWM control PWM2 so that constant power is supplied, thereby maintaining a constant heating temperature of the heating member 600.

To this end, the camera module 10 according to the first embodiment of the present invention may include: a first sensor sensing a first sensing resistor $R_{sense1}$ and a second voltage $V_{RO1}$; and a second sensor for sensing a second sensing resistor $R_{sense2}$ and a fourth voltage $V_{RO2}$.

The camera module 10 may include a connector 520. The connector 520 may be disposed on the substrate 510. The connector 520 may be electrically connected to the substrate 510. The connector 520 may be disposed between the first substrate 512 and the second substrate 514. The connector 520 may be coupled to the connection terminal 400. The connector 520 may be electrically connected to the connection terminal 400. The connector 520 may be electrically connected to the third region 430 of the connection terminal 400. The connector 520 may electrically connect the substrate 510 and the connection terminal 400.

The camera module 10 may include a heating member 600. The heating member 600 may be disposed in the lens module 300. The heating member 600 may be disposed between the lens barrel 200 and the lens module 300. The heating member 600 may be disposed between the first lens 310 and at least one lens of the lens module 300. The heating member 600 may be disposed below the first lens 310. The heating member 600 may be disposed in an area adjacent to a lower surface of the first lens 310. The heating member 600 may be coupled to the connection terminal 400. The heating member 600 may be coupled to the first region 410 of the connection terminal 400. The heating member 600 may be disposed between the inner side portion 412 and the outer side portion 414 of the first region 410 of the connection terminal 400. The heating member 600 may be coupled to the connection terminal 400 through an adhesive means 610 such as an adhesive. The heating member 600 is coupled to a partial region 412 of the first region 410 through a first adhesive means 610 such as an adhesive, and may be coupled to a partial region 414 of the first region 410 through a second adhesive means 620. The heating member 600 may be a heating wrap including a heating sheet and a heating wire disposed on the heating sheet. In this case, the heating wire may include a plurality of heating wires.

The heating member 600 may be electrically connected to the substrate 510 through the connection terminal 400. The heating member 600 may to generate heat by receiving current from the substrate 510. At this time, the heating member 600 may be bonded to the connection terminal 400 using anisotropic conductive film (ACF) which is an electrically conductive film. The heating member 600 may be a transparent heating film coated with indium thin oxide (ITO) having conductivity capable of generating heat by its own resistance component. The heating member 600 may be formed by, for example, a coating process or a deposition process of an indium tin oxide material. However, this is an example, and the material of the heating member 600 is not limited thereto and may be variously changed as long as it is a material that can be heated by supplying current.

The heating member 600 may be disposed in the connection terminal 400. The heating member 600 may be disposed between the inner side portion 412 and the outer side portion 414 of the connection terminal 400. The heating member 600 may include a body and a heating material disposed on the body. The heating material may include a first heating material disposed on an upper surface of the body and a second heating material disposed on a lower surface of the body. The body may be disposed between the inner side portion 412 and the outer side portion 414 of the connection terminal 400. The first heating material may be disposed on a lower surface of the inner side portion 412. The upper surface of the first heating material may be electrically coupled to a lower surface of the inner side portion 412. The upper surface of the first heating material may be ACF-bonded to a lower surface of the inner side portion 412 through a first contact means 610. The second heating material may be disposed on an upper surface of the outer side portion 414. A lower surface of the second heating material may be electrically coupled to an upper surface of the outer side portion 414. The lower surface of the second heating material may be ACF-bonded to an upper surface of the outer side portion 414 through the second contact means 620.

The camera module 10 may include a retainer 700. The retainer 700 may be disposed on an upper portion or in front of the housing 100. The retainer 700 may be coupled to the lens barrel 200. The retainer 700 may be disposed outer side of the lens barrel 200. The retainer 700 may be disposed above the first lens 310 of the lens module 300 to fix the lens module 300 and the lens barrel 200 to the housing 100. The retainer 700 may be coupled to the lens barrel 200 and fix the lens module 300 accommodated in the lens barrel 200. At this time, the end of the retainer 700 is formed in the shape of a letter '¬' to press and fix the lens module 300 accommodated in the lens barrel 200 downward, and can be coupled with the lens barrel 200 using an adhesive member such as epoxy. That is, the retainer 700 may be disposed on the lens barrel 200 to fix the first lens 310 which is the outermost lens. An O-ring 710 for removing a space formed between the retainer 700 and the lens module 300 may be disposed between the retainer 700 and the lens module 300. An O-ring 710 for removing a space formed between the retainer 700 and the first lens 310 may be disposed between the retainer 700 and the first lens 310.

Figure 10:
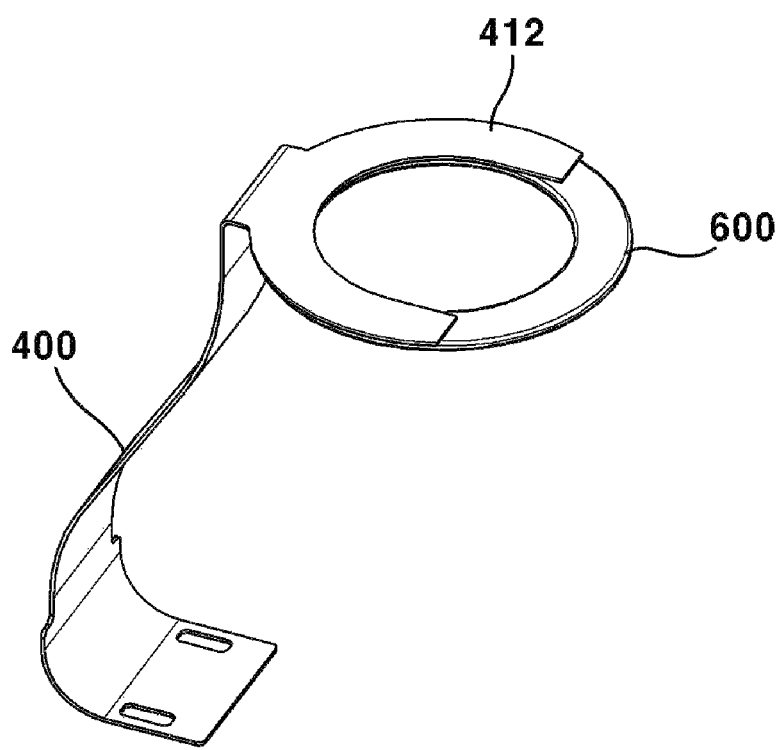
FIG. 10 is a perspective view of a connection terminal and a heating member of the camera module according to another embodiment of a first embodiment of the present invention.
Figure 11:
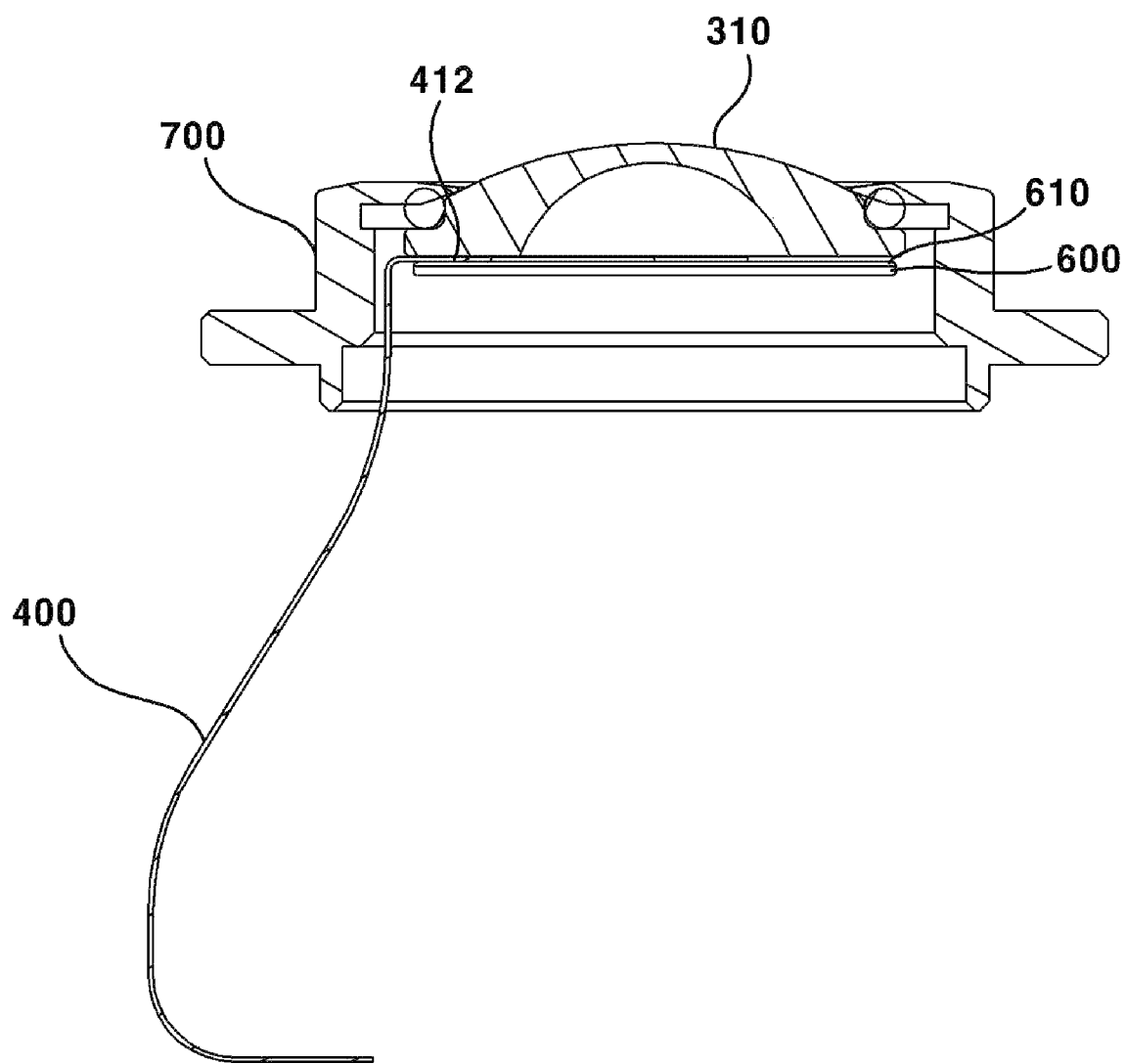
FIG. 11 is a partial cross-sectional view of a camera module according to another embodiment of a first embodiment of the present invention.
Figure 12:
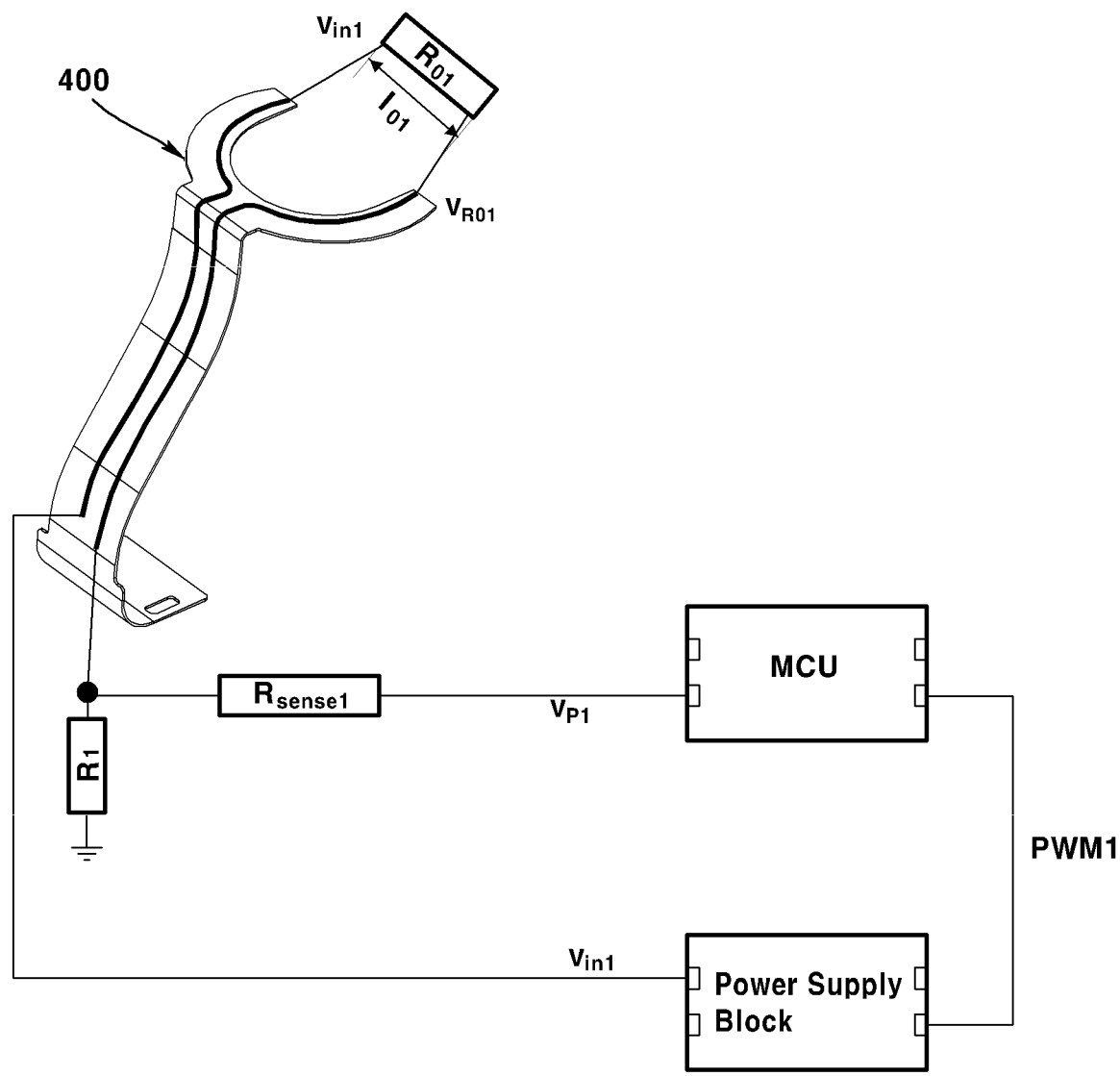
FIG. 12 and FIG. 13 are schematic circuit diagrams of a camera module according to another embodiment of a first embodiment of the present invention.
Figure 13:
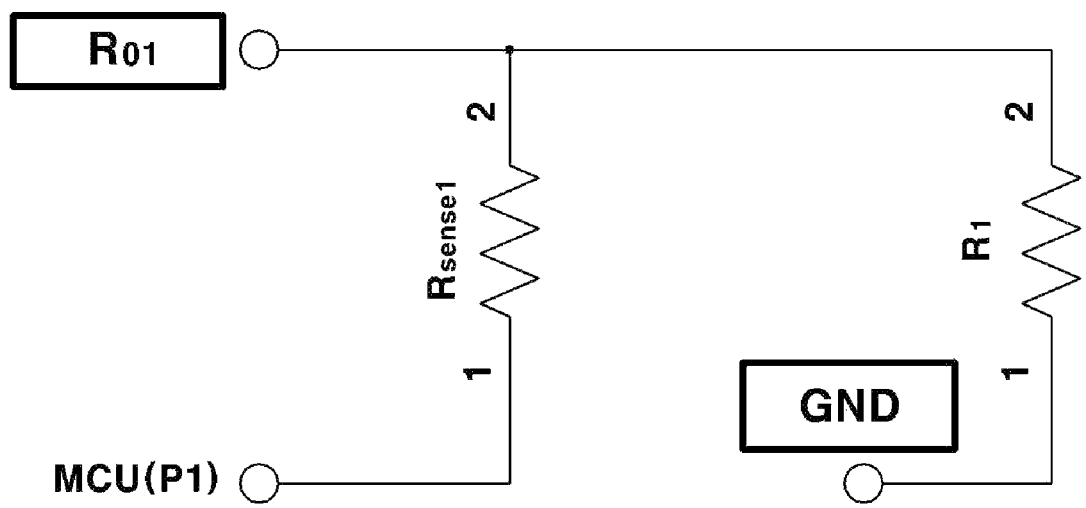

FIG. 10 is a perspective view of a connection terminal and a heating member of the camera module according to another embodiment of a first embodiment of the present invention. FIG. 11 is a partial cross-sectional view of a camera module according to another embodiment of a first embodiment of the present invention. FIG. 12 and FIG. 13 are schematic circuit diagrams of a camera module according to another embodiment of a first embodiment of the present invention.

FIGS. 10 to 13, the camera module 10 according to another embodiment of the first embodiment of the present invention may comprises: a housing 100; a lens barrel 200; a lens module 300; a connection terminal 400; a substrate 510; a connector 520; a heating member 600; and a retainer 700, but may be implemented excluding some of these configurations, and does not exclude other additional configurations.

In addition, the camera module 10 according to another embodiment of the first embodiment of the present invention may include a heating device. A heating device according to another embodiment of the first embodiment of the present invention may include a substrate 510, a connection terminal 400, and a heating member 600, but does not exclude other additional configurations.

Except for the configuration described below, the detailed configuration of the camera module 10 according to another embodiment of the first embodiment of the present invention will be understood to be the same as the detailed configuration of the camera module 10 according to the first embodiment of the present invention.

The first region 412 of the camera module 10 according to another embodiment of the first embodiment of the present invention may not be divided into an outer side portion and an inner side portion. That is, the first region 412 may have the same shape as the outer side portion 412 or the outer side portion 414 of the first region 410 according to the first embodiment of the present invention.

The first region 412 may be disposed on a lower surface of the first lens 310 which is the outermost lens, and the first region 412 may be coupled to an upper surface of the heating member 600. At this time, the lower surface of the first region 412 may be electrically connected to an upper surface of the heating member 600 through the contact means 610, for an example, may be ACF-bonded.

In this case, the circuit configuration of the camera module 10 according to another embodiment of the first embodiment of the present invention can satisfy Equations 1 and 3 of the circuit configuration of the camera module 10 according to a first embodiment of the present invention.

That is, the first resistor $R_{01}$ may be changed due to environmental factors such as temperature change, and this can be compensated through the first sensing resistor $R_{sense2}$ disposed between the first resistor $R_{01}$ and the control unit MCU.

Specifically, the change value of the first resistor $R_{01}$ can be known by sensing the first sensing resistor $R_{sense1}$ and the second voltage $V_{R01}$, and the change value of the second resistor $R_{02}$ can be known by sensing the second sensing resistor $R_{sense2}$ and the fourth voltage $V_{R02}$.

In addition, if the first resistor $R_{01}$ decreases than the initial value, the control unit MCU decreases the value of the second voltage $V_{R01}$ through the first PWM control PWM1, and if the first resistor $R_{01}$ increases than the initial value, the control unit MCU increases the value of the second voltage $V_{R01}$ through the first PWM control PWM1 so that constant power is supplied, thereby maintaining a constant heating temperature of the heating member 600.

In another embodiment of the first embodiment of the present invention, although it is described, as an example, that the first region 412 is disposed on a lower surface of the first lens 310 which is the outermost lens, and the first region 412 is coupled to an upper surface of the heating member 600, unlike this, the heating member 600 is disposed on a lower surface of the first lens 310 which is the outermost lens, and the first region 412 may be coupled to a lower surface of the heating member 600.

Hereinafter, a second embodiment of the present invention will be described in more detail with reference to the accompanying drawings.

Figure 14:
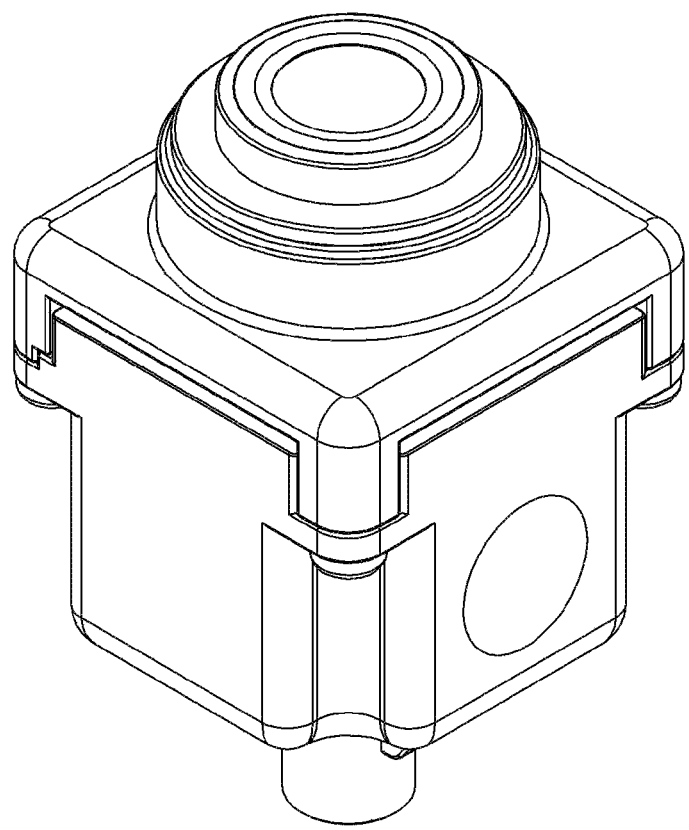
FIG. 14 is a perspective view of a camera device according to a second embodiment of the present invention.
Figure 15:
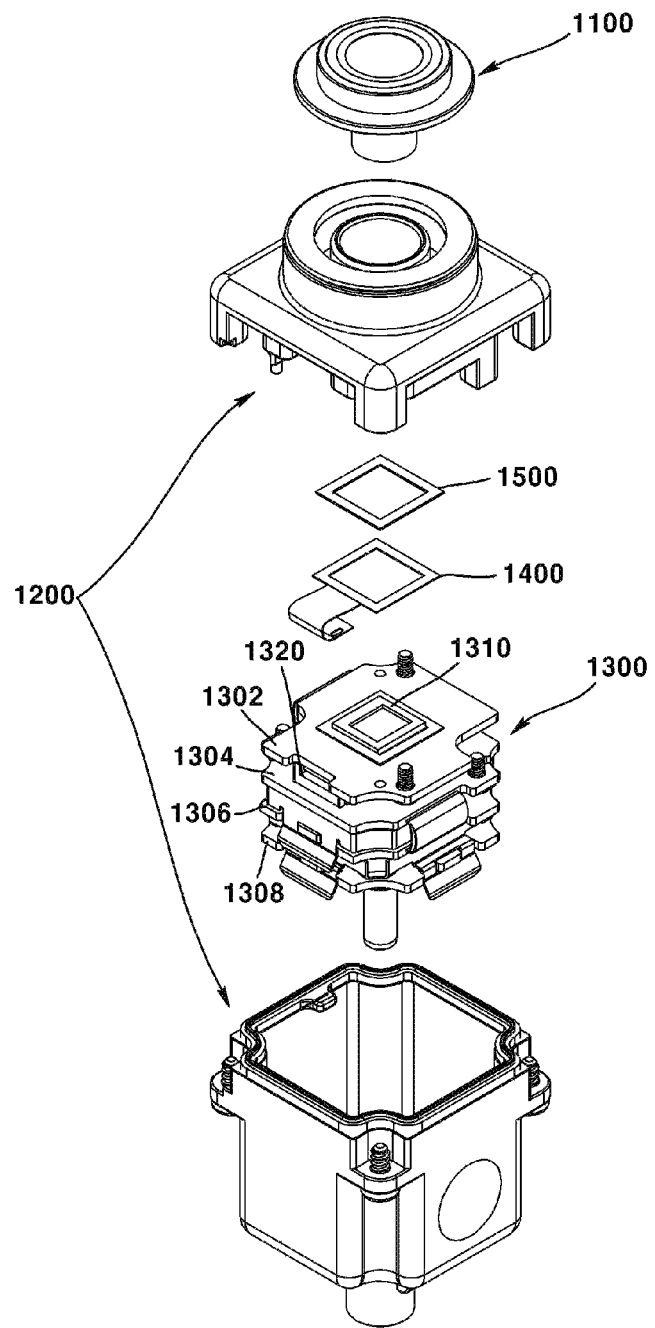
FIG. 15 is an exploded perspective view of a camera device according to a second embodiment of the present invention.
Figure 16:
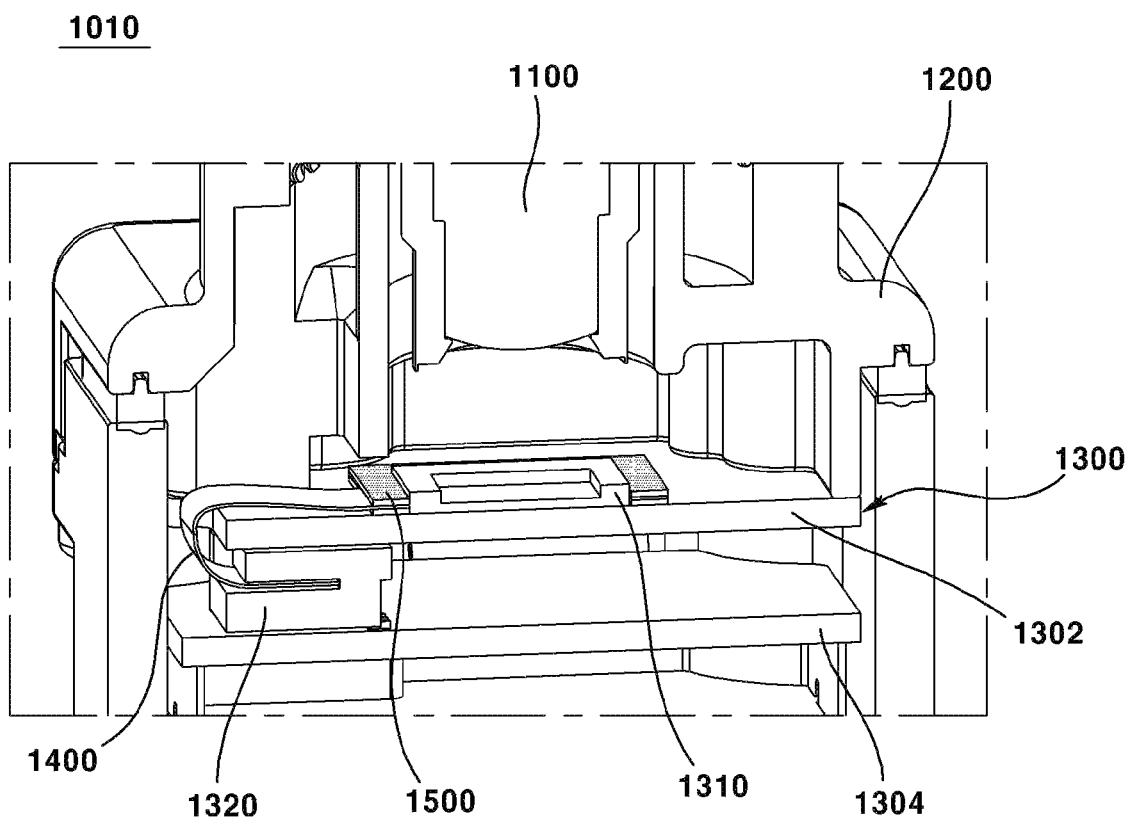
FIG. 16 is a partial cross-sectional view of a camera device according to a second embodiment of the present invention.
Figure 17:
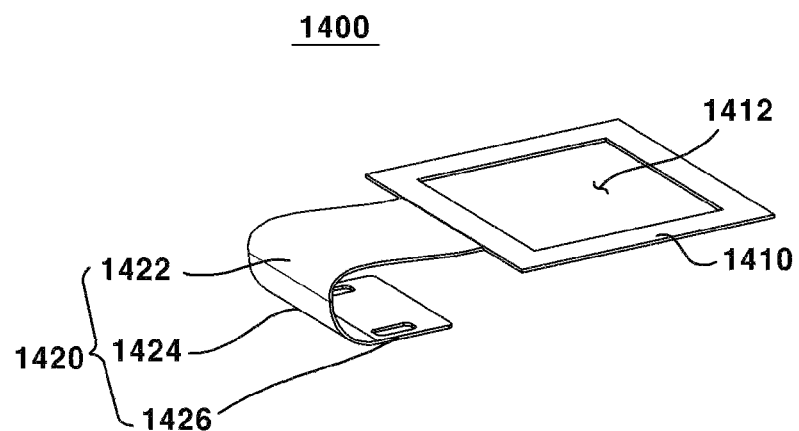
FIG. 17 and FIG. 18 are perspective views of a partial configuration of a camera device according to a second embodiment of the present invention.
Figure 18:
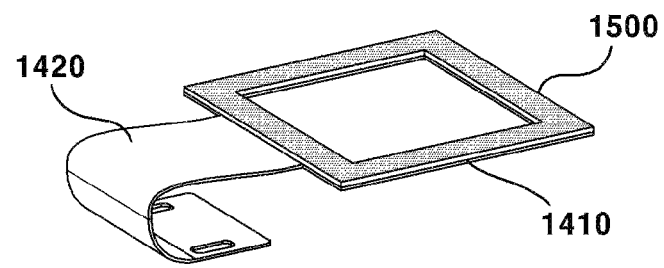
Figure 19:
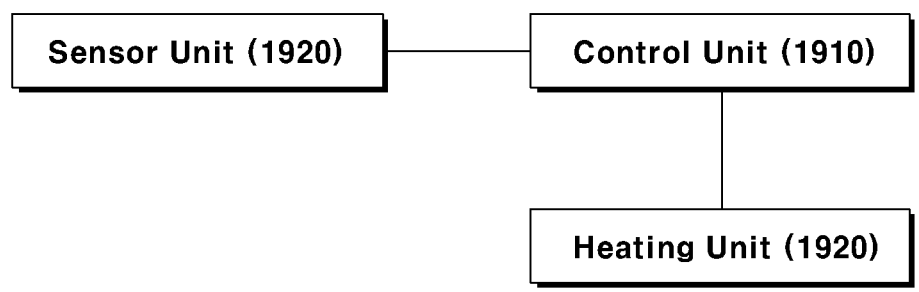
FIG. 19 is a block diagram of a camera device according to a second embodiment of the present invention.
Figure 20:
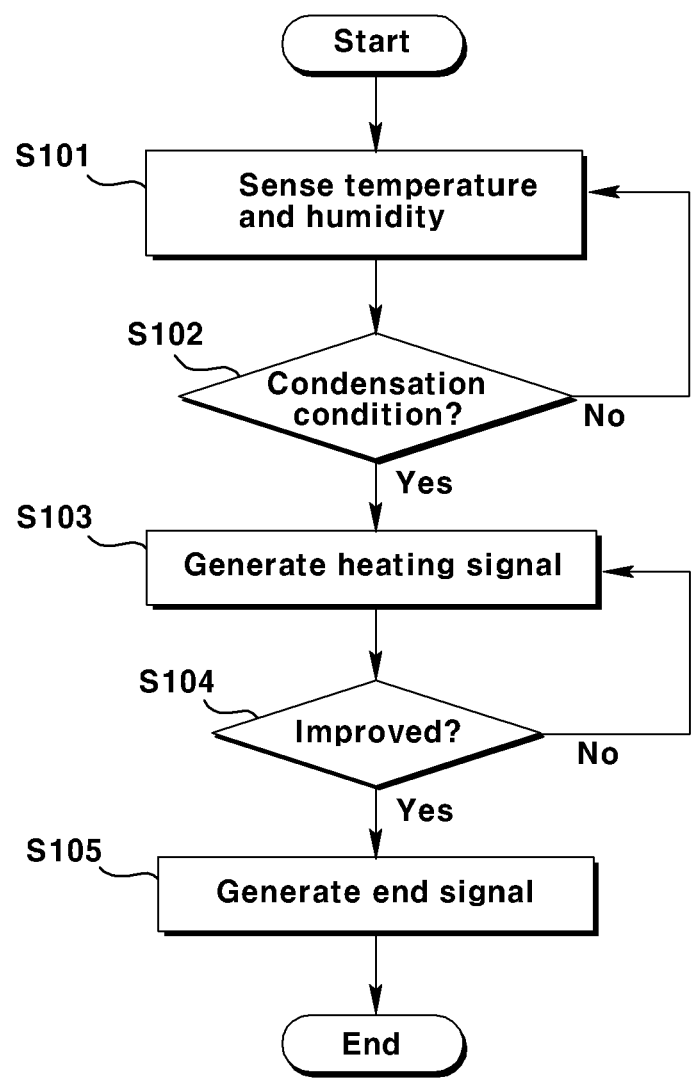
FIG. 20 is a flowchart of a camera device according to a second embodiment of the present invention.
Figure 21:
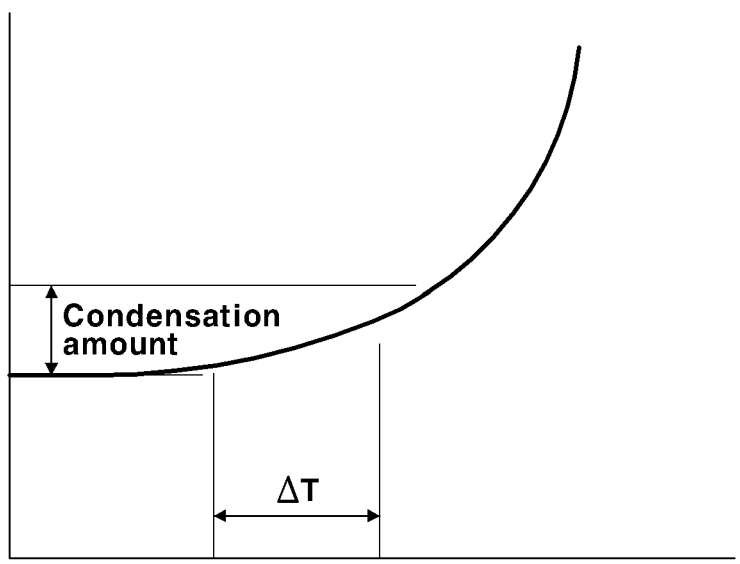
FIG. 21 is a graph for explaining the operation of a camera device according to a second embodiment of the present invention.

FIG. 14 is a perspective view of a camera device according to a second embodiment of the present invention. FIG. 15 is an exploded perspective view of a camera device according to a second embodiment of the present invention. FIG. 16 is a partial cross-sectional view of a camera device according to a second embodiment of the present invention. FIG. 17 and FIG. 18 are perspective views of a partial configuration of a camera device according to a second embodiment of the present invention. FIG. 19 is a block diagram of a camera device according to a second embodiment of the present invention. FIG. 20 is a flowchart of a camera device according to a second embodiment of the present invention. FIG. 21 is a graph for explaining the operation of a camera device according to a second embodiment of the present invention.

Referring to FIGS. 14 to 21, a camera device 1010 according to a second embodiment of the present invention may comprise: a lens module 1100; a housing 1200; a substrate 1300; an image sensor 1310; a heater 1410; a connection terminal 1420; a desiccant 1500; a control unit 1910; and a sensor unit 1920, but may be implemented excluding some of these configurations, and does not exclude additional configurations other than this.

In addition, referring to FIGS. 14 to 21, the humidity controller of the camera device 1010 according to the second embodiment of the present invention may include: a heater 1410; a connection terminal 1420; and a desiccant 1500, however, it may be implemented excluding some of these configurations, and does not exclude additional configurations other than this.

The camera device 1010 may include a lens module 1100. The lens module 1100 may be disposed in the housing 1200. At least a portion of the lens module 1100 may be accommodated in the housing 1200. At least a portion of the lens module 1100 may penetrate through an opening of the housing 1200 and may be disposed in front or above the housing 1200. The lens module 1100 may be screw-coupled to the inner circumferential surface of the housing 1200. The lens module 1100 may have a screw thread formed on the outer circumferential surface corresponding to the screw thread formed on the inner circumferential surface of the housing 1200. The lens module 1100 may include at least one lens. Each lens of the lens module 1100 may be made of a synthetic resin material, a glass material, or a quartz material, but is not limited thereto and may be made of various materials.

The camera device 1010 may include a housing 1200. The housing 1200 may form the outer appearance of the camera device 1010. A lens module 1100, a substrate 1300, a heater 1410, a connection terminal 1420, and a desiccant 1500 may be disposed in the housing 1200. The housing 1200 may include an upper housing and a lower housing. In the second embodiment of the present invention, the housing 1200 is described with a hexahedral shape as an example, but is not limited thereto.

The camera device 1010 may include a substrate 1300. The substrate 1300 may be disposed in the housing 1200. The substrate 1300 may be disposed inside the housing 1200. The substrate 1300 may be disposed below the lens module 1100. The substrate 1300 may include a printed circuit board (PCB) or a flexible printed circuit board (FPCB). The substrate 1300 may be coupled to the connection terminal 1420. The substrate 1300 may be electrically connected to the connection terminal 1420. The substrate 1300 may be electrically connected to the third region 1426 of the connection terminal 1420. The substrate 1300 may be electrically connected to the connection terminal 1420 through a connection member 1320. An image sensor 1310 may be mounted on the substrate 1300. The substrate 1300 may be electrically connected to the image sensor 1310.

The substrate 1300 may include a plurality of substrates 1302, 1304, 1306, and 1308. The substrate 1300 may comprise: a first substrate 1302 on which the image sensor 1310 is disposed; a second substrate 1304 disposed below the first substrate 1302 and electrically connected to the first substrate 1302; a third substrate 1306 disposed below the second substrate 1304 and electrically connected to the second substrate 1304; and a fourth substrate 1308 disposed below the third substrate 1306 and electrically connected to the third substrate 1306. At this time, the first to fourth substrates 1302, 1304, 1306, and 1308 may be spaced apart from each other in the optical axis direction (vertical direction), respectively, and may be disposed in parallel to improve space efficiency. A connection member 1320 may be disposed between the first substrate 1302 and the second substrate 1304. In the second embodiment of the present invention, the plurality of substrates 1302, 1304, 1306, and 1308 is described by taking four substrates as an example, but is not limited thereto, and the number of the plurality of substrates 1302, 1304, 1306, and 1308 can be changed variously.

The camera device 1010 may include an image sensor 1310. The image sensor 1310 may be disposed in the housing 1200. The image sensor 1310 may be disposed inside the housing 1200. The image sensor 1310 may be disposed on the substrate 1300. The image sensor 1310 may be electrically connected to the substrate 1300. The image sensor 1310 may be disposed on a front surface or an upper surface of the first substrate 1302. The image sensor 1310 may be disposed in the opening 1412 of the heater 1410 and/or the opening of the desiccant 1500. The image sensor 1310 may be mounted on one surface of the first substrate 1302. The image sensor 1310 may be electrically connected to the first substrate 1302. For example, the image sensor 1310 may be coupled to the substrate 1300 by a surface mounting technology (SMT). As another example, the image sensor 1310 may be coupled to the substrate 1300 by a flip chip technology. An optical axis of the image sensor 1310 may be aligned with an optical axis of the lens module 1100.

The camera device 1010 may include a heating element 1400. The heating element 1400 may include a connection terminal 1420 and a heater 1410. At least a portion of the heating element 1400 may be formed of a flexible printed circuit board or a flexible board. The heating element 1400 may radiate heat by receiving a current from the substrate 1300. The heating element 1400 may be a transparent heating film coated with indium thin oxide (ITO) having conductivity capable of generating heat by its own resistance component. The heating element 1400 may be formed by, for example, a coating process or a deposition process of an indium tin oxide material. However, this is an example, and the material of the heating element 1400 is not limited thereto, and may be variously changed as long as it is a material that can be heated by supplying current.

The camera device 1010 may include a connection terminal 1420. The connection terminal 1420 may be coupled to the substrate 1300. The connection terminal 1420 may be electrically connected to the substrate 1300. The connection terminal 1420 may be coupled to the second substrate 1304. The connection terminal 1420 may be electrically connected to the second substrate 1304. The connection terminal 1420 may be coupled to the connection member 1320. The connection terminal 1420 may be electrically connected to the substrate 1300 through the connection member 1320. The connection terminal 1420 may be connected to a power source disposed on the substrate 1300. The connection terminal 1420 may be coupled to the heater 1410. The connection terminal 1420 may be formed of a flexible printed circuit board or a flexible board. The connection terminal 1420 may be formed in the shape of a letter 'ㄷ' as a whole.

The connection terminal 1420 may comprise: a first region 1422 coupled to the heater 1410; a third region 1426 coupled to the substrate 1300; and a second region 1424 connecting the first region 1422 and the third region 1426. One side of the first region 1422 may be connected to the heater 1410; at least a portion of the first region 1422 may be bent downward; and the other side of the first region 1422 may be connected to the second region 1424. The first region 1422 may be extended in a horizontal direction as a whole. One side of the second region 1424 may be connected to the first region 1422, and the other side may be connected to the third region 1426. At least a portion of the second region 1424 may be bent. The second region 1424 may be extended in an overall vertical direction. One side of the third region 1426 is connected to the second region 1424, and the other side may be coupled to the substrate 1300. The other side of the third region 1426 may be directly coupled to the second substrate 1304, and may be electrically connected to the first substrate 1302 and/or the second substrate 1304 through a connection member 1320.

The camera device 1010 may include a heater 1410. The heater 1410 may be connected to the connection terminal 1420. The heater 1410 may be electrically connected to the connection terminal 1420. The heater 1410 may be connected to the first region 1422 of the connection terminal 1420. The heater 1410 may be electrically connected to the first region 1422 of the connection terminal 1420. The heater 1410 may have a closed-loop shape. The heater 1410 may be disposed on the substrate 1300. A heater 1410 may be disposed on the first substrate 1302. The heater 1410 may be disposed on a front surface or on an upper surface of the first substrate 1302. The heater 1410 may be adhered on a front surface or on an upper surface of the first substrate 1302. The heater 1410 may be disposed in an area adjacent to the image sensor 1310. The heater 1410 may be disposed in an area surrounding the image sensor 1310. The heater 1410 may include an opening 1412. An image sensor 1310 may be disposed in the opening 1412 of the heater 1410. The heater 1410 may be formed in the shape of a letter 'ㅁ'. Unlike this, the shape of the heater 1410 may be formed in a donut or triangular band shape corresponding to the shape of the image sensor 1310. The heater 1410 may include a heating wire having a closed loop shape. Through this, when current is supplied to the heater 1410, more heat can be emitted than the connection terminal 1420. That is, when current is supplied through the connection terminal 1420, the heater 1410 may generate heat to remove moisture from the desiccant 1500.

The camera device 1010 may include a desiccant 1500. The desiccant 1500 may be disposed on the heater 1410. The desiccant 1500 may be disposed on one surface of the heater 1410. The desiccant 1500 may be adhered to one surface of the heater 1410. The desiccant 1500 may be adhered to a front surface or on an upper surface of the heater 1410. The desiccant 1500 may be adhered to one surface of the heater 1410 through an adhesive or the like. The desiccant 1500 may be adhered through an adhesive film attached to one surface of the desiccant 1500. The desiccant 1500 may be disposed in an area adjacent to the image sensor 1310. The desiccant 1500 may be disposed in an area surrounding the image sensor 1310. The desiccant 1500 may be formed in a shape corresponding to the shape of the heater 1410. The desiccant 1500 may include an opening. An image sensor 1310 may be disposed in the opening of the desiccant 1500. The desiccant 1500 may be formed in the shape of a letter 'ㅁ'. The desiccant 1500 may have a closed-loop shape. The desiccant 1500 may include silica gel. The desiccant 1500 is preferably formed to have a width of 25 mm, a length of 25 mm, and a thickness of 1.3 mm. In this case, interference with other components in the camera device 1010 may be inhibited. In addition, since the contact area with the heater 1510 is important, the desiccant 1500 may be disposed on both sides of the heater 1510.

The desiccant 1500 may absorb moisture generated in the housing 1200. Specifically, the desiccant 1500 may absorb moisture when the internal temperature of the housing 1200 is less than or equal to the first reference value. At this time, the first reference value means a value predetermined by a designer. For example, the first reference value may be room temperature or a value between 25° C. and 30° C. Unlike this, the desiccant 1500 may absorb moisture when the internal humidity of the housing 1200 is equal to or greater than the third reference value.

In FIGS. 15 to 18, the heater 1410 and the desiccant 1500 have been described as having a '☐' shape as an example, but the heater 1410 and the desiccant 1500 may have a rectangular, circular, or triangular shape. In this case, the heater 1410 and the desiccant 1500 may be disposed on an inner side surface of the substrate 1300 or the housing 1200.

In addition, in FIGS. 15 to 18, the heater 1410 and the desiccant 1500 have been described as being disposed in the region surrounding the image sensor 1310 as an example, but is not limited thereto, and the heater 1410 and the desiccant 1500 may be disposed in a region surrounding the lens module 1100.

The camera device 1010 may include a sensor unit 1920. The sensor unit 1920 may be disposed in the housing 1200. The sensor unit 1920 may be disposed inside the housing 1200. The sensor unit 1920 may be disposed on the substrate 1300. The sensor unit 1920 may be electrically connected to the substrate 1300. The sensor unit 1920 may measure temperature and/or humidity inside the housing 1200. The sensor unit 1920 may be electrically connected to the control unit 1910. Temperature and/or humidity information measured by the sensor unit 1920 may be transmitted to the control unit 1910. The sensor unit 1920 may include a sensor that measures temperature and/or humidity. Unlike this, the sensor unit 1920 may include a first sensor for measuring temperature and a second sensor for measuring humidity.

The camera device 1010 may include a control unit 1910. The control unit 1910 may be disposed on the substrate 1300. The control unit 1910 may be electrically connected to the sensor unit 1920 and the heating unit 1930. The control unit 1910 may control the heating unit 1930 based on the temperature and/or humidity information inside the housing 1200 measured by the sensor unit 1920. Here, the heating unit 1930 may mean the heating element 1400. The heating unit 1930 may include a connection terminal 1420 and a heater 1410. Unlike this, the heating unit 1930 may mean only the heater 1410. The control unit 1910 may control ON/OFF of the heater 1410. Specifically, the control unit 1910 may operate the heater 1410 when the internal temperature of the housing 1200 is equal to or greater than a second reference value. In this case, the second reference value means a value predetermined by the designer. For example, the second reference value may be a value between 85° C. and 100° C. Unlike this, the control unit 1910 may operate the heater 1410 when the internal humidity of the housing 1200 is less than or equal to a fourth reference value. For example, in the second embodiment of the present invention, the control unit 1910 operates the heater 1410 at 120 degrees within about 1 to 2 minutes to remove moisture from the desiccant 1500.

Hereinafter, a method of adjusting the humidity controller of the camera device 1010 according to the second embodiment of the present invention will be described with reference to FIG. 20.

In step S101 for sensing temperature and/or humidity, the sensor unit 1920 senses the temperature and/or humidity inside the housing, and transmits this information to the control unit 1910.

In step S102 for confirming whether the condensing condition is satisfied, if the condensing condition is met, the control unit 1910 proceeds step S103 for generating the heating signal, and if not corresponding to the condensing condition, step S101 for sensing temperature and/or humidity shall be proceeded again.

Here, whether the condensing condition corresponds to the temperature and humidity values measured by the sensor unit 1920 may be determined according to an area in which the temperature and humidity graph of FIG. 21 is located as a reference. In this case, the horizontal axis means temperature and the vertical axis means humidity.

In step S103 for generating the heating signal, the control unit 1910 transmits the heating signal to the heating element 1400 to heat the heating element 1400. In this case, the heating element 1400 may mean a heater 1410 excluding the connection terminal 1420.

In step S104 for confirming the improvement, it is measured through the sensor unit 1920 whether the temperature and humidity environment inside the housing 1200 is improved. When improved, the control unit 1910 generates an end signal, and when not improved, the control unit 1910 continuously generates a heating signal.

In step S105 for generating an end signal, when the temperature and humidity environment inside the housing 1200 measured by the sensor unit 1920 is improved, the control unit 1910 ends the generation of the heating signal.

Therefore, it is possible to inhibit condensation including frost from occurring on the lens of the lens module 1100 through the camera device 1010 according to the second embodiment of the present invention, and to properly maintain the humidity inside the housing 1200.

Figure 22:
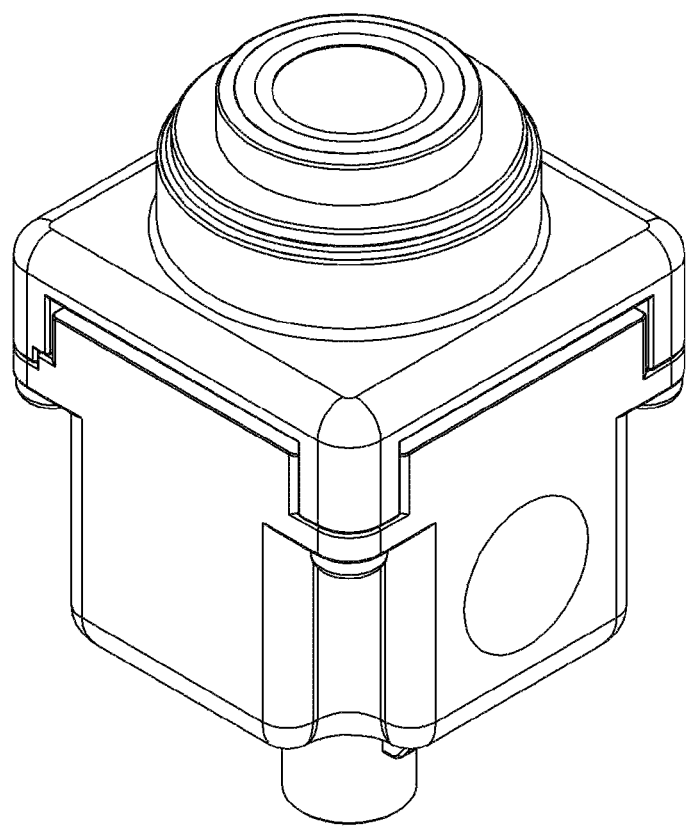
FIG. 22 is a perspective view of a camera device according to another embodiment of a second embodiment of the present invention.
Figure 23:
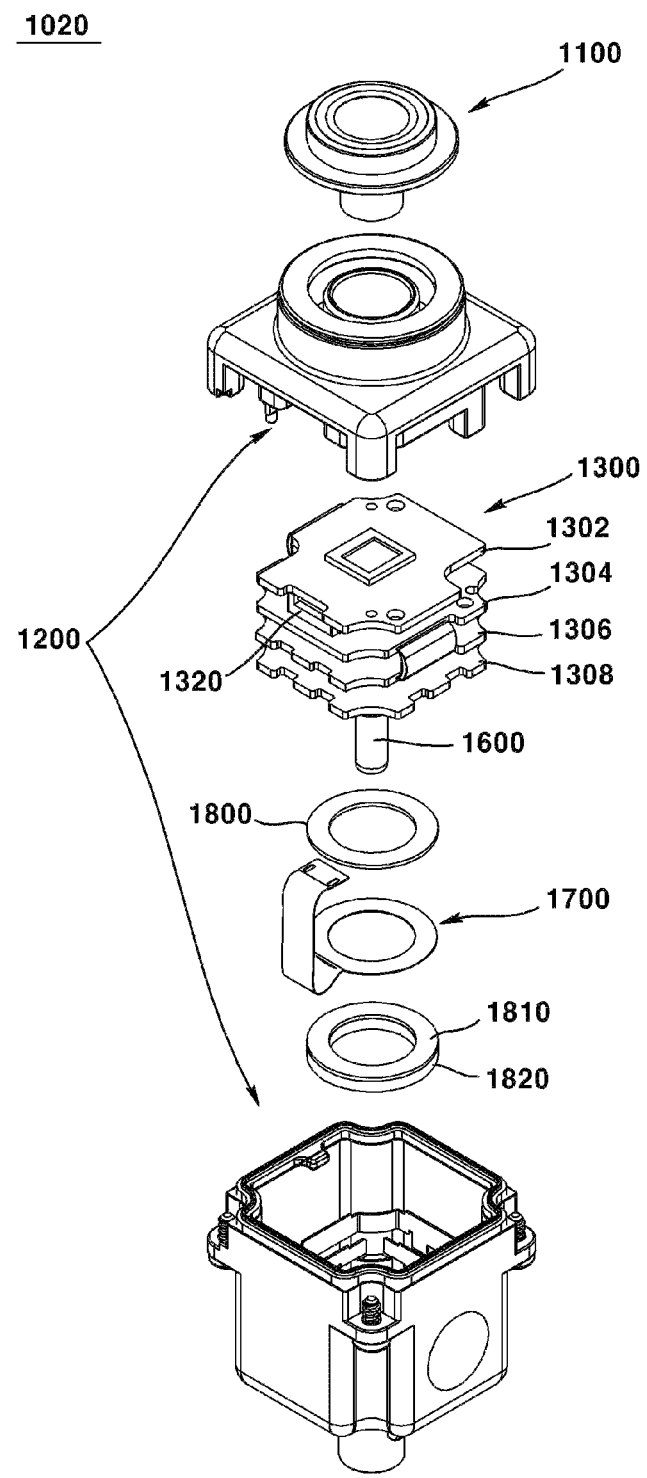
FIG. 23 is an exploded perspective view of a camera device according to another embodiment of a second embodiment of the present invention.
Figure 24:
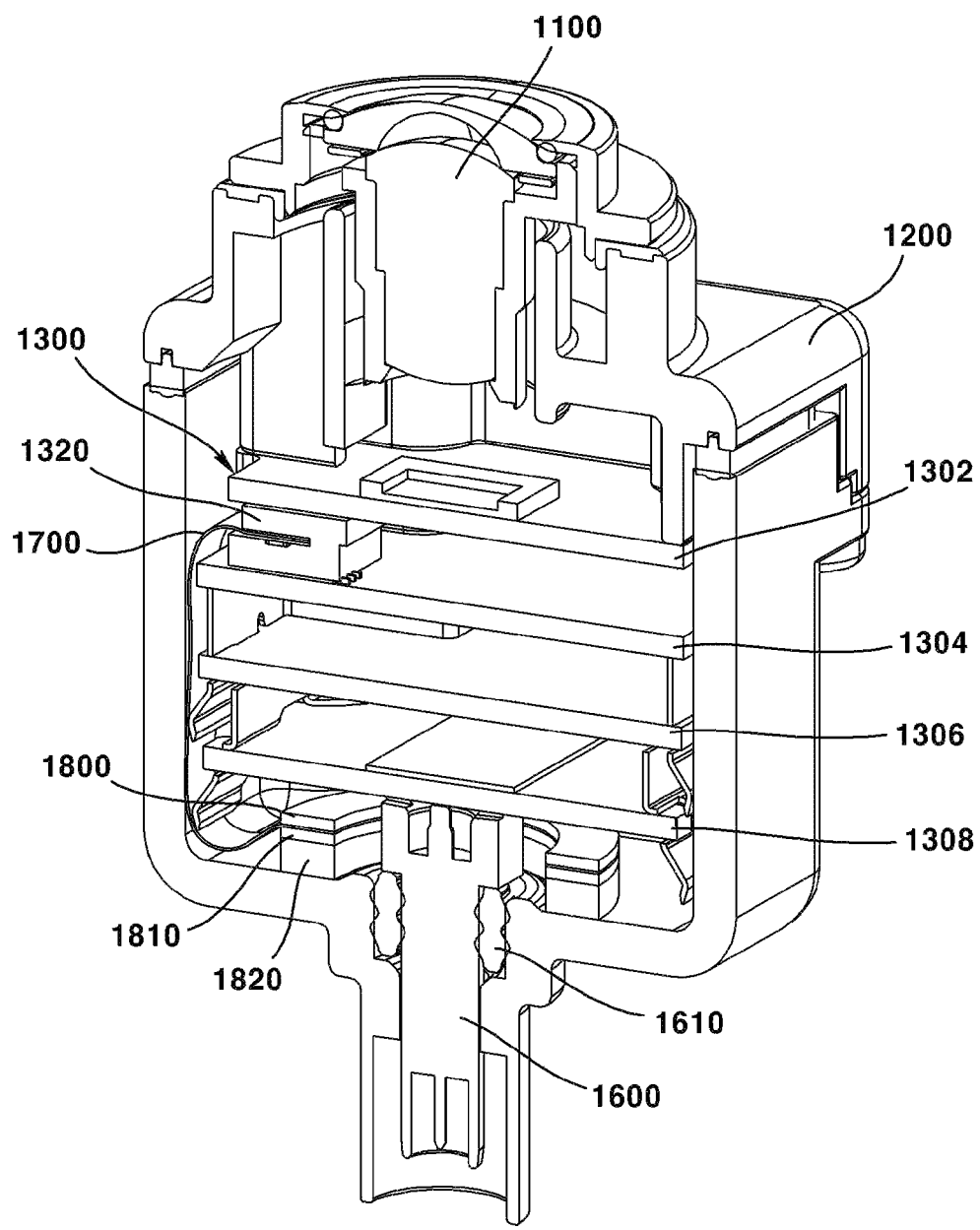
FIG. 24 is a partial cross-sectional view of a camera device according to another embodiment of a second embodiment of the present invention.
Figure 25:
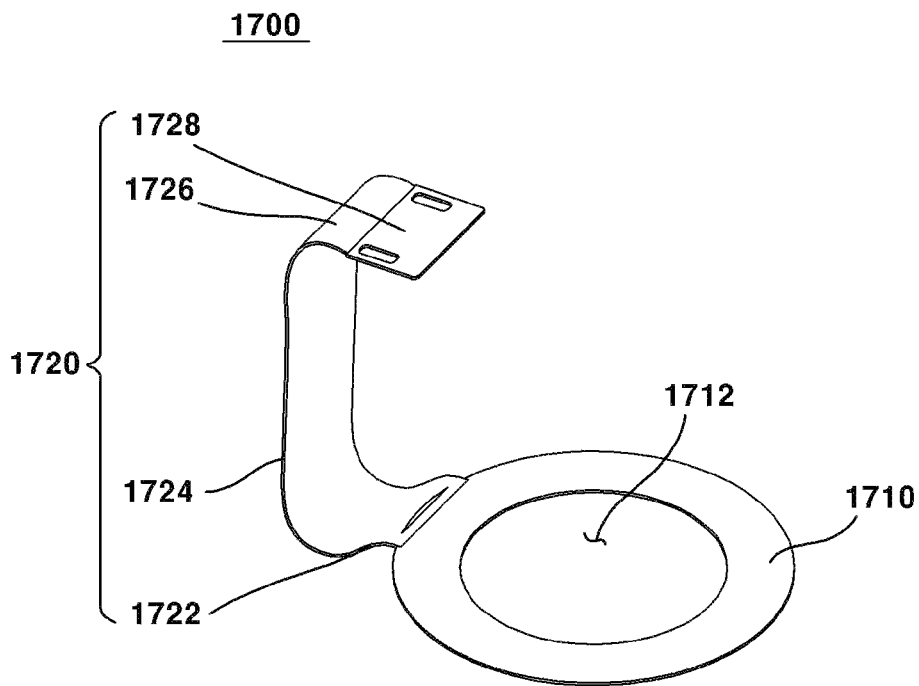
FIG. 25 and FIG. 26 are perspective views of a partial configuration of a camera device according to another embodiment of a second embodiment of the present invention.
Figure 26:
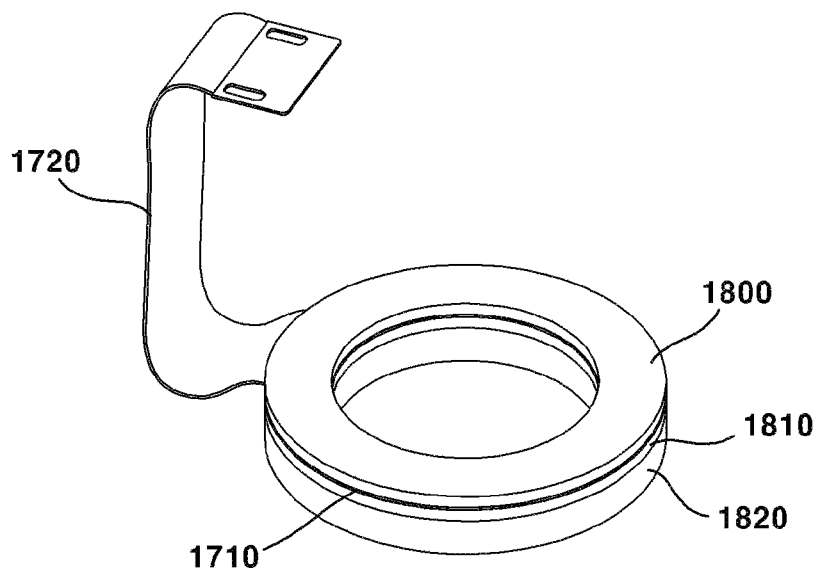

FIG. 22 is a perspective view of a camera device according to another embodiment of a second embodiment of the present invention. FIG. 23 is an exploded perspective view of a camera device according to another embodiment of a second embodiment of the present invention. FIG. 24 is a partial cross-sectional view of a camera device according to another embodiment of a second embodiment of the present invention. FIG. 25 and FIG. 26 is a perspective view of a partial configuration of a camera device according to another embodiment of a second embodiment of the present invention.

Referring to FIGS. 22 to 26, a camera device 1020 according to another embodiment of the second embodiment of the present invention may include: a lens module 1100; a housing 1200; a substrate 1300; an image sensor 1310; a connector 1600; a heater 1710; a connection terminal 1720; a desiccant 1800; a control unit 1910; and a sensor unit 1920, but it may be implemented excluding some of these configurations, and does not exclude additional configurations.

In addition, referring to FIGS. 22 to 26, the humidity controller of the camera device 1020 according to another embodiment of the second embodiment of the present invention may include: a heater 1710; a connection terminal 1720; and a desiccant 1800, but it may be implemented excluding some of these configurations, and does not exclude additional configurations.

It can be understood that the configuration of the camera device 1020 according to another embodiment of the second embodiment of the present invention, which is not described below, is the same as that of the camera device 1010 according to the second embodiment of the present invention within the same drawings.

The camera device 1020 may include a connector 1600. The connector 1600 may be disposed in the housing 1200. The connector 1600 may be coupled to the substrate 1300. The connector 1600 may penetrate through the housing 1200 and be coupled to the substrate 1300. The connector 1600 may be electrically connected to the substrate 1300. The connector 1600 may supply external power into the camera device 1020. A cross-section of the connector 1600 may be formed in a circular shape. Unlike this, the cross-section of the connector 1600 may be variously changed to an elliptical or rectangular shape and the like. The camera device 1010 according to the second embodiment of the present invention may also include a connector 1600. An O-ring 1610 may be disposed in the space between the connector 1600 and the housing 1200 to seal the space between the connector 1600 and the housing 1200.

The camera device 1020 may include a heating element 1700. The heating element 1700 may include a connection terminal 1720 and a heater 1710. At least a portion of the heating element 1700 may be formed of a flexible printed circuit board or a flexible board. The heating element 1700 may radiate heat by receiving a current from the substrate 1300. The heating element 1700 may be a transparent heating film coated with indium thin oxide (ITO) having conductivity capable of generating heat by its own resistance component. The heating element 1700 may be formed by, for example, a coating process or a deposition process of an indium tin oxide material. However, this is an example, and the material of the heating element 1700 is not limited thereto and may be variously changed as long as it is a material that can be heated by supplying current.

The camera device 1020 may include a connection terminal 1720. The connection terminal 1720 may be coupled to the substrate 1300. The connection terminal 1720 may be electrically connected to the substrate 1300. The connection terminal 1720 may be coupled to the second substrate 1304. The connection terminal 1720 may be electrically connected to the second substrate 1304. The connection terminal 1720 may be coupled to the connection member 1320. The connection terminal 1720 may be electrically connected to the substrate 1300 through the connection member 1320. The connection terminal 1720 may be connected to a power supply disposed on the substrate 1300. The connection terminal 1720 may be coupled to the heater 1410. The connection terminal 1720 may be formed of a flexible printed circuit board or a flexible board. The connection terminal 1720 may be formed in the shape of a letter 'ㄷ' as a whole.

The connection terminal 1720 may include: a first region 1722 disposed adjacent to the connector 1600 and coupled to the heater 1710; a fourth region 1728 coupled to the substrate 1300; a second and a third regions 1724 and 1726 connecting the first region 1722 and the fourth region 1728. One side of the first region 1722 may be connected to the heater 1710, and the other side of the first region 1722 may be connected to the second region 1724. At least a portion of the first region 1722 may be bent. The first region 1722 may be extended vertically in a horizontal direction. One side of the second region 1724 may be connected to the first region 1722, and the other side of the second region 1724 may be connected to the third region 1726. The second region 1724 may be extended in a vertical direction as a whole. One side of the third region 1726 may be connected to the second region 1724, and the other side of the third region 1726 may be connected to the fourth region 1728. At least a portion of the third region 1726 may be bent. The third region 1726 may be extended in a horizontal direction as a whole. One side of the fourth region 1728 may be connected to the third region 1726. The fourth region 1728 may be coupled to the substrate 1300. Specifically, the fourth region 1728 may be directly coupled to the second substrate 1304, or may be electrically connected to the substrate 1300 and/or the second substrate 1304 through the connection member 1320.

The camera device 1020 may include a heater 1710. The heater 1710 may be connected to the connection terminal 1720. The heater 1710 may be electrically connected to the connection terminal 1720. The heater 1710 may be connected to the first region 1722 of the connection terminal 1720. The heater 1710 may be electrically connected to the first region 1722 of the connection terminal 1720. The heater 1710 may have a closed-loop shape. The heater 1710 may be disposed adjacent to the inner side surface of the housing 1200. The heater 1710 may be disposed adjacent to a lower surface of the inner side surface of the housing 1200. The heater 1710 may be disposed in an area adjacent to the connector 1600. The heater 1710 may include an opening 1712. At least a portion of the connector 1600 may be disposed in the opening 1712 of the heater 1710. The heater 1710 may be disposed in a region surrounding the connector 1600. The heater 1710 may be formed in an 'O' shape or a donut shape. Unlike this, the shape of the heater 1710 may be formed in a rectangular or triangular band shape corresponding to the cross-sectional shape of the connector 1600. The heater 1710 may include a heating wire having a closed loop shape. Through this, when current is supplied to the heater 1710, it is possible to emit more heat than the connection terminal 1420. That is, when current is supplied through the connection terminal 1720, the heater 1710 may generate heat to remove moisture from the desiccant 1700.

The camera device 1020 may include a desiccant 1800. The desiccant 1800 may be disposed on the heater 1710. The desiccant 1800 may be disposed on one surface of the heater 1710. The desiccant 1800 may be adhered to one surface of the heater 1710. The desiccant 1800 may be adhered to an upper surface of the heater 1410. The desiccant 1800 may be adhered to an upper surface of the heater 1410 through an adhesive or the like. The desiccant 1800 may be disposed in an area adjacent to the connector 1600. The desiccant 1800 may be disposed around the connector 1600. The desiccant 1800 may be disposed in an area surrounding the connector 1600. The desiccant 1800 may be disposed adjacent to an inner side surface of the housing 1200. The desiccant 1800 may be disposed adjacent to a lower surface of an inner side surface of the housing 1200. The desiccant 1800 may include an opening. At least a portion of the connector 1600 may be disposed in the opening of the desiccant 1800. The desiccant 1800 may be formed in the same shape as the heater 1710. The desiccant 1800 may be formed in an 'O' shape or a donut shape. Unlike this, the shape of the desiccant 1800 may be formed in a rectangular or triangular band shape to correspond to the shape of the heater 1710. The desiccant 1800 may include silica gel. The desiccant 1800 is preferably formed to have a width of 25 mm, a length of 25 mm, and a thickness of 1.3 mm. In this case, interference with other components in the camera device 1020 may be inhibited. In addition, since the contact area with the heater 1710 is important, the desiccant 1800 may be disposed on both sides of the heater 1710. In this case, the heat insulator 1820 may be disposed between the desiccant 1800 disposed on a lower surface of the heater 1710 and an inner side surface of the housing 1200 or may be excluded from the configuration.

The desiccant 1800 may absorb moisture generated inside the housing 1200. Specifically, the desiccant 1800 may absorb moisture when the internal temperature of the housing 1200 is equal to or less than the first reference value. In this case, the first reference value means a value predetermined by a designer. Unlike this, the desiccant 1800 may absorb moisture when the internal humidity of the housing 1200 is equal to or greater than the third reference value.

In FIGS. 23 to 26, the heater 1710 and the desiccant 1800 have been described as having an 'O' shape as an example, but the heater 1710 and the desiccant 1800 may have a rectangular, circular, or triangular shape. In this case, the heater 1710 and the desiccant 1800 may be disposed on an inner side surface of the substrate 1300 or the housing 1200.

The camera device 1020 may include a heat insulating material 1820. The heat insulating material 1820 may be disposed on the other surface of the heater 1710. The heat insulating material 1820 may be adhered to the other surface of the heater 1710 through an adhesive 1810. The heat insulating material 1820 may be disposed between the heater 1710 and the inner side surface of the housing 1200. Through this, when the housing 1200 is formed of an aluminum material, heat generated from the heater 1710 may be inhibited from being lost through the housing 1200. That is, the efficiency of transferring heat generated from the heater 1710 to the desiccant 1800 may be improved. The shape of the heat insulating material 1820 may be formed to correspond to the shape of the heater 1710.

The camera device 1020 according to another embodiment of the second embodiment of the present invention can achieve the same operational effects as the camera device 1010 according to the second embodiment of the present invention.

In the above, the first and second embodiments of the present invention have been separately described, but the third embodiment of the present invention may include at least a part of the first embodiment and at least a part of the second embodiment together. For example, the third embodiment may include both the heating member 600 and the desiccant 1500. The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A heating device comprising:
   a substrate;
   a connection terminal electrically connected to the substrate; and
   a heating member electrically connected to the connection terminal,
   wherein the connection terminal comprises:
   a first region comprising an inner side portion and an outer side portion;
   a third region electrically connected to the substrate; and
   a second region disposed between the first region and the third region,
   wherein the heating member is disposed between the inner side portion and the outer side portion of the connection terminal,
   wherein the inner side portion and the outer side portion are perpendicular to an optical axis direction,
   wherein a height at which the inner side portion is positioned and a height at which the outer side portion is positioned in the optical axis direction are different from each other,
   wherein the substrate comprises a control unit and a resistor disposed between the connection terminal and the control unit,
   wherein the resistor comprises a first resistor and a second resistor,
   wherein the first resistor is electrically connected to the first connection portion of the connection terminal, and the second resistor is electrically connected to the second connection portion of the connection terminal,
   wherein the first connection portion comprises a first electrode portion having a first voltage and a second electrode portion having a second voltage lower than the first voltage,
   wherein the second connection portion comprises a third electrode portion having a third voltage and a fourth electrode portion having a fourth voltage lower than the third voltage, and
   wherein the first resistor is electrically connected to the second electrode portion of the first connection portion, and the second resistor is electrically connected to the fourth electrode portion of the second connection portion.

2. The heating device according to claim 1, wherein the inner side portion is bent and extended from a middle region of one end of the second region, and the outer side portion is bent and extended from an outer side region of the one end of the second region.

3. The heating device according to claim 1, wherein the inner side portion and the outer side portion are spaced apart from each other.

4. The heating device according to claim 1, wherein the inner side portion and the outer side portion each comprises a curved region.

5. The heating device according to claim 1, wherein the heating member is formed in a close-loop shape.

6. The heating device according to claim 1, wherein the heating member comprises a body and a heating material disposed on the body.

7. The heating device according to claim 6, wherein the heating material comprises:
   a first heating material disposed on an upper surface of the body of the heating member; and
   a second heating material disposed on a lower surface of the body of the heating member.

8. The heating device according to claim 6, wherein the inner side portion is disposed on an upper surface of the heating member, and the outer side portion is disposed on a lower surface of the heating member.

9. A camera module comprising:
   a substrate;
   a lens barrel disposed on the substrate;
   a first lens disposed on the lens barrel;
   a heating member disposed between the first lens and the lens barrel; and
   a connection terminal electrically connected to the heating member,
   wherein the heating member includes a body and a heating material disposed on the body, and wherein the connection terminal comprises:
a first region connected to the heating material of the heating member;
a third region electrically connected to the substrate; and
a second region disposed between the first region and the third region,
wherein the first region comprises an inner side portion and an outer side portion;
wherein the heating material of the heating member is disposed between the inner side portion and the outer side portion of the connection terminal,
wherein the inner side portion and the outer side portion are perpendicular to an optical axis direction,
wherein a height at which the inner side portion is positioned and a height at which the outer side portion is positioned in the optical axis direction are different from each other,
wherein the substrate comprises a control unit and a resistor disposed between the connection terminal and the control unit,
wherein the resistor comprises a first resistor and a second resistor,
wherein the first resistor is electrically connected to the first connection portion of the connection terminal, and the second resistor is electrically connected to the second connection portion of the connection terminal,
wherein the first connection portion comprises a first electrode portion having a first voltage and a second electrode portion having a second voltage lower than the first voltage,
wherein the second connection portion comprises a third electrode portion having a third voltage and a fourth electrode portion having a fourth voltage lower than the third voltage, and wherein the first resistor is electrically connected to the second electrode portion of the first connection portion, and the second resistor is electrically connected to the fourth electrode portion of the second connection portion.

10. The camera module according to claim 9, wherein the heating material comprises a first heating material disposed on an upper surface of the body of the heating member and a second heating material disposed on a lower surface of the body of the heating member, and
wherein the first region of the connection terminal comprises a first connection portion connected to the first heating material and a second connection portion connected to the second heating material.

11. The camera module according to claim 9, wherein the first lens is a lens disposed at an outermost region, and
wherein the first region of the connection terminal and the heating material are connected to a lower surface of the first lens.

12. The camera module according to claim 9, comprising a retainer disposed on the lens barrel to fix the first lens.

13. The camera module according to claim 9, comprising a desiccant disposed on the heating member.

14. The camera module according to claim 13, wherein the desiccant is disposed on at least one of an upper surface of the heating member and a lower surface of the heating member.

15. The camera module according to claim 13, wherein the desiccant is disposed between the lens barrel and the heating member.

16. The camera module according to claim 13, wherein the desiccant is formed in a closed loop shape.

* * * * *